United States Patent [19]

Ganz et al.

[11] Patent Number: 6,049,762

[45] Date of Patent: Apr. 11, 2000

[54] STANDARDIZING A SPECTROMETRIC INSTRUMENT

[75] Inventors: Alan M. Ganz, Scarsdale, N.Y.; Yongdong Wang, Wilton; David H. Tracy, Norwalk, both of Conn.; Robert A. Hoult, Beaconsfield, United Kingdom; Jerry E. Cahill, Trumbull, Conn.; David A. Huppler, Madison, Wis.

[73] Assignee: Perkin Elmer LLC, Norwalk, Conn.

[21] Appl. No.: 08/993,482

[22] Filed: Dec. 18, 1997

[51] Int. Cl.[7] .................................................. G01R 35/00
[52] U.S. Cl. .......................... 702/104; 356/319; 356/325; 356/328; 702/22
[58] Field of Search ................................ 702/22, 28, 23, 702/104; 356/319, 325, 328

[56] References Cited

U.S. PATENT DOCUMENTS

| | | | |
|---|---|---|---|
| 5,303,165 | 4/1994 | Ganz et al. | 356/319 |
| 5,545,895 | 8/1996 | Wright et al. | 702/23 |
| 5,710,713 | 1/1998 | Wright et al. | 702/23 |
| 5,850,623 | 12/1998 | Carman, Jr. et al. | 702/28 |

*Primary Examiner*—Marc S. Hoff
*Assistant Examiner*—Hien Vo
*Attorney, Agent, or Firm*—St. Onge Steward Johnston & Reens LLC

[57] ABSTRACT

Standardization is achieved for FTIR spectrometric instruments that effect an intrinsic distortion in spectral information, the distortion being associated with an aperture size. An idealized function of spectral line shape is specified. With a small calibration aperture, spectral data is obtained for a basic sample having known "true" spectral data, and standard spectral data also is obtained for a standard sample. With a larger, normal sized aperture, standard spectral data is obtained again for the calibration sample. A transformation factor, that is a function of this data and the standardized function, is applied to spectral data for test samples to effect standardized information. In another embodiment, the standard sample has known true spectral data, and the basic sample is omitted. In either case, the transformation factor is applied to the sample data in logarithm form, the antilogarithm of the result effects the standardized information.

80 Claims, 10 Drawing Sheets

STANDARDIZING A SPECTROMETRIC INSTRUMENT

This invention relates to spectrometric instruments, and particularly to the standardization of spectral information generated by such instruments.

BACKGROUND

Spectrometric instruments are used for a variety of applications usually associated with analyses of materials. A spectrum is generated in interaction with a sample material to effect a spectral beam that is characteristic of the sample and impinged on a photodetector. Modern instruments include a computer that is receptive of spectral data from the detector to generate and compare spectral information associated with the materials. The spectrum may be generated, for example, by a dispersion element such as a prism or a holographic grating that spectrally disperses light passed by a sample or received from a plasma or other excitation source containing sample material. Another type of instrument incorporates a time varying optical interference system, in which an interference pattern of light is produced and passed through a sample material that modifies the pattern. In such an instrument Fourier transform computations are applied to the detector signals to transform the modified light pattern into spectral data. The Fourier transform instrument is most commonly operated in the infrared range, in which case it is known as an "FTIR" instrument.

With improvements in optics, detectors and computerization, there has evolved an ability to perform very precise measurements. Examples are an absorption spectrophotometer, a polychromator or an FTIR instrument that use chemometric mathematical analysis to measure octane number in gasolines. Differences in octane number are associated with subtle differences in near infrared (IR) absorption spectra. The very small changes in spectral characteristics cannot effectively be detected directly by personnel, and computerized automation is a necessity. It also is desirable for such spectral measurements to be effected continuously on line. Thus there is an interest in utilizing advanced spectrometry methods for analytical chemistry.

A problem with high precision measurements is that instruments vary from each other, and each instrument varies or drifts with time. One aspect of the problem is achieving and maintaining wavelength calibration. A more subtle aspect is that the instruments have intrinsic characteristics that are associated with spectral profiles and are individual to each instrument and may vary with time. Intrinsic characteristics of the instrument distort the data, rendering comparisons inaccurate. In an instrument such as a polychromator with a dispersion grating, an intrinsic characteristic is typified by the profile of spectral data representing a very narrow, sharp spectral line. Such a profile has an intrinsic shape and line width wider than the actual line, due to the fundamental optical design as well as diffraction effects and other imperfections in the optics and (to a lesser extent) electronics in the instrument. An actual intrinsic profile may not be symmetrical. In a grating polychromator and similar instruments, the instrument profile from a narrow line source is often similar to a Gaussian profile. For other instruments such as FTIR, the intrinsic profile attributable to aperture size at the limit of resolution is more rectangular.

U.S. Pat. No. 5,303,165 (Ganz et al) of the present assignee discloses a method and apparatus for standardizing a spectrometric instrument having a characteristic intrinsic profile of spectral line shape for a hypothetically thin spectral line in a selected spectral range. The instrument includes a line source of at least one narrow spectral line that has an associated line width substantially narrower than the width of the intrinsic profile. A target profile is specified having a spectral line shape for a hypothetically sharp spectral line, for example a Gaussian profile of width similar to that of the intrinsic width. The instrument is operated initially with the line source to produce a set of profile data for the line such that the data is representative of the intrinsic profile. A transformation filter is computed for transforming the profile data to a corresponding target profile, and is saved. The instrument then is operated normally with a sample source to produce sample data representative of a sample spectrum. The transformation filter is applied to the sample data to generate standardized data representative of the sample. Such standardized data is substantially the same as that obtained from the same sample material with any similar instrument, and repeatedly with the same instrument over time.

Standardization according to the foregoing patent is utilized particularly with an instrument having the capability to utilize a source of one or more spectral lines, such as a Fabry-Perot etalon placed in the beam from the light source in place of a sample, so as to pass the spectral line to the grating or other dispersion element. In the case of certain other instruments including FTIR, it is possible but cumbersome to utilize such a line source for such a standardization technique.

Conventional FTIR instruments are taught in textbooks such as "Fourier Transform Infrared Spectrometry" by P. R. Griffiths and J. A. de Haseth (Wiley, 1986). In these instruments, an interference pattern of light is produced with a Michaelson or similar interferometer comprising a beam splitter which is a partial reflector that splits white light into two beams. These beams are reflected back and recombined at the beam splitter. The path length of one of the beams is varied with time to produce a time-varied interference pattern. This light pattern is directed through an angle-selecting aperture and thence through a sample material that modifies the pattern. Fourier transform computations transform the modified pattern into spectral data representing intensity vs. wavenumber. (Wavenumber is reciprocal of wavelength and proportional to frequency.) The aperture generally should be as small as practical to minimize distortion of the spectral beam due to finite size of the aperture and the size and configuration of the light source, and other instrument features. The distortion has several aspects: ordinary broadening which is predictable but not generally corrected; wavelength shift; and pattern shape change due to reflections, alignment, flatness of mirrors, light source geometry, and the like. Distortions related to wavelength shift and shape change are addressed by the present invention. A very small aperture may sufficiently minimize distortion, but passes the light at too low an intensity, thereby requiring long term operations for sufficient spectral data. Therefore, normal operations are made with a larger aperture that introduces more distortion.

A further characteristic of FTIR is that the limit of resolution (minimum line width) attributable to the aperture is a function of the spectral wavenumber, in particular being proportional to the wavenumber, viz. greater line width at higher wavenumber. To apply the transformation of the aforementioned U.S. Pat. No. 5,303,165 would require defining and storing a separate target profile for many increments in the wavenumber scale in the selected spectral range, and operating the instrument repeatedly or with a source of many lines to obtain the corresponding intrinsic profiles that would be applied individually to test data. This could be cumbersome for frequent restandardizations, and may substantially lengthen the computation times for every analysis with the instrument.

An object of the invention is to provide a spectrometric instrument with a novel means for effecting standardized spectral information. Another object is to provide a novel method for standardizing spectral information from spectrometric instruments that intrinsically distort the data. Other objects are to provide a novel method and a novel means for transforming spectral data of the instrument so that spectral information is idealized for comparison with that of the same instrument at other times, or with other similar instruments. A further object is to provide such standardizing for an instrument where distortion of data is dependent on spectral wavenumber. Yet another object is to provide a computer readable storage medium with means for effecting standardized spectral information in instruments that incorporate computers. A particular object is to provide such standardizing for an interferometer instrument that incorporates Fourier transform.

SUMMARY

The forgoing and other objects are achieved, at least in part, by a method of, and means for, standardizing spectral information for a sample in a spectrometric instrument that effects an intrinsic distortion into spectral data. The instrument includes an optical train with spectral means for effecting a spectral beam responsively to a sample such that the spectral beam is characteristic of the sample, detector means for detecting the spectral beam to effect signal data representative thereof, computing means receptive of the signal data for computing corresponding spectral information representative of the sample, and display means for displaying the spectral information. The optical train includes an optical component that selectively has a standardizing condition or an operational condition, such condition having the intrinsic distortion associated therewith. The sample is selectable from a sample set that includes a test sample and one or more standard samples formed of a substance having true spectral data.

An idealized function of spectral line shape is specified for a hypothetically sharp spectral line. Standard spectral data for a standard sample with the standardizing condition are obtained, and a standard function that relates the standard spectral data to the true spectral data is established. These functions and data are stored, advantageously at the factory, for future application to test spectral data to effect standardized spectral data. In operational situations, operational spectral data are obtained for the same or a similar standard sample with the operational condition, and this data is also stored for future application to test spectral data. The idealized function, the standard function, the standard spectral data and the operational spectral data are related with a transformation function. Test spectral data for one or more test samples are then obtained with the operational condition. Standardized spectral information for the test sample, corrected for the intrinsic distortion, is computed by application of the transformation function to the test spectral data.

The standard function may be established theoretically or, more accurately, by use of another, basic sample having predetermined fundamental spectral data. In the latter case, the instrument is operated with the standardizing condition to obtain basic spectral data for the basic sample with the standardizing condition. The standard function is determined by a relationship with the basic spectral data and the fundamental spectral data.

In another embodiment, operations with the standardizing condition are omitted, and the standard sample is formed of a substance having fundamental spectral data with a predetermined profile. An idealized function for spectral line shape is specified and stored with the fundamental spectral data for future application to spectral data. Operational spectral data for a standard sample are obtained in an operational situation, and stored. Without changing instrument conditions to change intrinsic distortion, test spectral data for a test sample are obtained. The idealized function, the fundamental spectral data and the standard spectral data are related with a transformation function. Standardized spectral information for the test sample, corrected for the intrinsic distortion, is computed by application of the transformation function to the test spectral data.

The invention is particularly suitable for an instrument in which the spectral means comprises an interferometer for effecting a time-scanned interference beam passed through the sample to effect the spectral beam, and the spectral data is obtained by applying a Fourier transform computation to corresponding signal data. For such an instrument, the idealized function has a profile with a width proportional to wavenumber, so it is advantageous to specify the idealized function in logarithmic space independently of wavenumber. Similarly, the standard function is established in logarithmic space independently of wavenumber. Sample data are obtained by application of the Fourier transform to corresponding signal data to effect preliminary data, and computation of a logarithm of the corresponding preliminary data to effect corresponding sample data in the logarithmic space. The transformation filter is thus defined in the logarithmic space. The standardized spectral information is effected by computation of a logarithmic form of the test spectral data, multiplication of the logarithmic form by the transformation filter to effect a transformed form of the test spectral data, and computation of an anti-logarithm of the transformed form to effect the standardized spectral information.

Objects are also achieved with a computer readable storage medium for utilization in standardizing spectral information for a spectrometric instrument of a type described above. The storage medium has data code and program code embodied therein so as to be readable by the computing means of the instrument. The data code includes an idealized function for spectral line shape, and standard spectral data obtained for a standard sample with the standardizing condition. The program code includes means for establishing a standard function that relates the standard spectral data to the true spectral data, means for storing operational spectral data obtained for a standard sample with the operational condition, and means for relating the idealized function, the standard function, the standard spectral data and the operational spectral data with a transformation function. The program code further includes means for computing standardized spectral information for the test sample corrected for the intrinsic distortion by application of the transformation function to test spectral data obtained for a test sample with the operational condition.

Objects are further achieved with a computer readable storage medium for utilization in standardizing spectral information for a spectrometric instrument of a type described above, the storage medium having data code embodied therein so as to be readable by the computing means of the instrument. The data code comprises an idealized function for spectral line shape associated with the standardizing condition, and standard spectral data obtained for a standard sample with the standardizing condition. The idealized function and the standard spectral data have a cooperative relationship for application to test spectral data obtained for a test sample with the operational condition.

In another embodiment the data code comprises hypothetical spectral information derived from true spectral data for the standard sample by application of an idealized function for spectral line shape, and a baseline for spectral data. The program code comprises means for effecting converted spectral data by application of the baseline to measured spectral data for a standard sample with the operational condition. The converted spectral information is available for computation of standardized spectral information therefrom by the computing means, and the hypothetical spectral information is available for comparison with the standardized spectral information.

DETAILED DESCRIPTION

Figure 1:
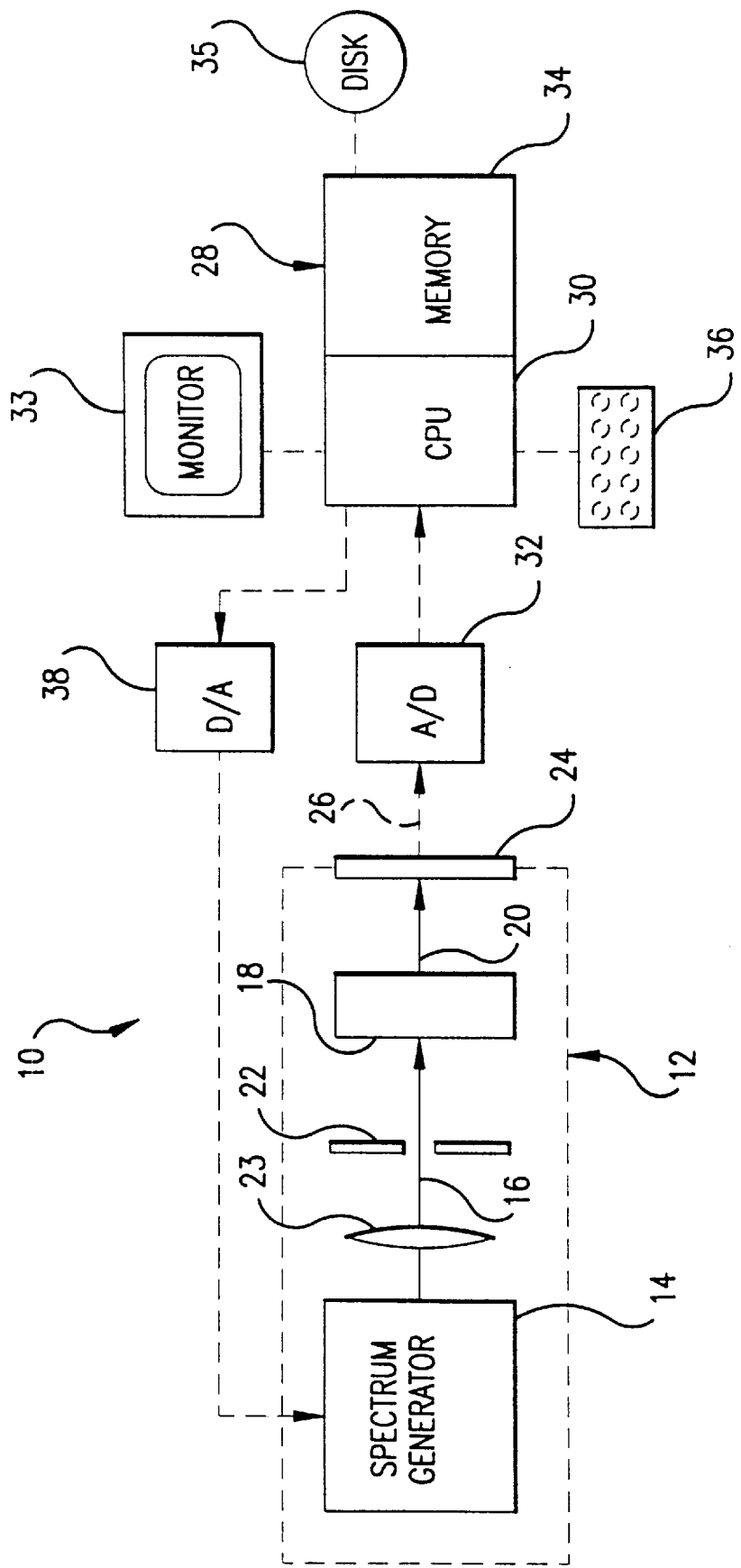
FIG. 1 is a schematic drawing of a spectrometric instrument used for the invention.

FIG. 1 schematically shows a spectrometric instrument 10 utilized for the invention, the instrument generally being conventional except as described herein. An optical train 12 includes a spectrum generator or spectral means 14 that effects a spectral pattern 16 of some form in the range of infra-red, visible and/or ultraviolet light. The spectral means may be, for example, a dispersion element such as a prism or a holographic grating that spectrally disperses light received from a plasma or other excitation source containing a sample material, or from a sample material transmitting or reflecting light. In a preferable embodiment of the present invention, an FTIR instrument is utilized in which the spectral means 14 consists of an optical interference system in combination with means for applying Fourier transform computations to transform an interference pattern into spectral data. The spectrum (which herein is defined broadly to include an ordinary spectrum as well as a time-varied interference pattern) is further associated with a sample 18 to effect a spectral beam 20 that is responsive to the sample so that the beam is spectrally characteristic of the sample.

Other optical components including focusing means such as a concave mirror or lens 23 generally are disposed in the optical train. For the present purpose, one such component introduces an intrinsic distortion into the spectral beam as explained below. The distortion component may be, for example, an aperture stop 22 (as shown), a shaped light source, an imperfect lens or reflector, misalignment of a optical components, or any combination of these. In FTIR, the distortion is primarily representative of finite size and shape of the light source as manifested through the aperture stop 22.

The tandem order of optical elements is characteristic of the instrument but not important to this invention. For example, a variable distortion component (such as a variable aperture stop) may be disposed anywhere in the optical train, or the sample may be integral with the light source such as a sample injected into a plasma source. Also, the spectrum may be reflected by the sample to effect the spectral beam. Thus, as used herein, the term "transmitted by a sample" more generally includes reflection as an alternative.

A detector 24 receives the spectral beam to effect signal data on an electrical line 26, the data being representative of the beam spectrum 20 as modified by the sample. The detector may be a conventional photomultiplier tube or solid state photodetector. A computer 28 is receptive of the data signals to compute corresponding spectral information representative of the sample. A display for the computer such as a monitor 33 and/or a printer displays the spectral information.

The computer 28 may be conventional, such as a Digital model DEC PC 590, usually incorporated into the instrument by the manufacturer thereof. The computer should include a central processing unit 30 (CPU) with a analog/digital (A/D) converter 32 from the detector (the term "signal data" herein referring to data after such conversion). Sections of computer memory 34 typically include RAM, an internal hard disk and a portable storage medium 35 such as a floppy disk, CD-ROM, and/or a tape with relevant code embedded therein. A keyboard 36 is generally provided for operator input. The computer also may provide signals via a digital/analog (D/A) converter 38 to control the spectrum generator. One or more additional dedicated chip processing units (not shown), may be utilized for certain steps. For example in FTIR, a separate chip is used for the Fourier transform computations, and another for controlling alignment and the like. The present invention is implemented conveniently with the main CPU, utilizing data and program codes representing steps and means for carrying out the invention. Such codes advantageously are provided in a computer-readable storage medium such as the hard disk of the computer or a floppy disk that may be utilized with the computer of an otherwise conventional instrument.

Programming is conventional such as with "C++" which generally is incorporated into the computer by the manufacturer of the computer or the instrument for conventional operations. Adaptations of the programming are made for the present invention. Programming from flow diagrams and descriptions herein is conventional and readily effected by one skilled in the art. The details of such programming are not important to this invention. As the computer computations may involve considerable data and therefore be extensive, a high performance processor such as an Intel Pentium™ of at least 100 MHz is recommended, although a 486 processor should be sufficient.

The invention is suited particularly for incorporation into a Fourier transform infra red (FTIR) type of spectrometric instrument (FIG. 2) such as a Perkin-Elmer model Paragon 1000. Such an instrument normally is used for the range of 400 to 15,000 cm$^{-1}$ (wavenumber) (25 to 0.7 $\mu$m wavelength range). In the spectrum generator 14, white light from a source 40, such as an electrically heated nichrome wire acting as a black body radiation source, is transmitted in the optical train through a first aperture 41 which becomes an effective source of light for the remainder of the optical train. The light continues through a collimator, such as a lens 42 or a mirror, and a combination of reflectors that constitute a conventional Michaelson interferometer. In this combination, the incoming white light beam 43 is split by a semi-reflective mirror 44 that reflects a first half 46 of the light beam and transmits the second half 48. The first beam 46 is reflected by a fixed mirror 50 back through the semi-reflector 44. The second beam 48 also is reflected back. This beam has a variable path length which may be accomplished in a simple system (not shown) by a second mirror 52 to reflect back the semi-reflector, the second mirror being movable on the light axis.

For better precision and alignment, the second mirror 52 is fixed but offset, and a pair of angled reflectors 54, 56 is interposed to reflect the second beam to and back from the offset mirror 52. The angled reflectors are mounted in parallel and nominally about 45° to the main light axis 53 on a platform 55 that is rotatable about an axis 57 centered midway between the mounted reflectors. The platform is connected directly or through its axle to a motor 58 that rotationally oscillates the orientation of the parallel reflectors over a range such as about 10° centering on the nominal 45°. The range setting may be under computer control. The number of oscillations in one data run is selected to provide sufficient spectral data, for example 16 cycles. The rotation varies the total path length of the second beam. The precise change in path length may be determined conventionally by a laser beam (not shown) interposed into the interferometer, or into another interferometer using the same pair of parallel reflectors, and counting nulls detected in the laser interference pattern (automatically by the computer if desired). Path length generally is changed up to about 10 mm in each oscillation, A portion of the first beam 46 passes through the semi-reflector 44. A portion of the second beam 48 is reflected by the semi-reflector to combine with the first beam and thereby effect a time-scanned interference form of the spectral pattern 16. The spectral beam may be folded if desired by one or more additional mirrors (not shown). The spectral pattern or interference beam 16 is passed through a lens 23 which focuses the beam at the aperture stop 22 and an adjacent sample 18 which may be a standard sample or an unknown test sample, for example an organic fluid such as gasoline. Due to spectral absorption by the sample, the spectral beam transmitted from the sample is characteristic of the sample. This beam is passed through a further lens 25 (or pair of lenses) that is disposed to focus the sample onto the detector 24. The focused beam is thus incident on the detector 24 which effects signals to the computer 28 (FIG. 1) in proportion to the beam intensity which varies according to the sample with the oscillation of the pair of reflectors 54, 56. One or more of the lenses may be replaced by concave mirrors with equivalent functions.

The interference pattern, and thereby the spectral beam from the sample, is formed of a continuum of spectral wavenumbers that the computer digitizes into wavenumber increments. In a conventional FTIR instrument, the computer is programmed for Fourier transformation computations to sort the signal data into ordinary type spectral data representing a plot of intensity vs wavenumber. This data is processed further into corresponding spectral information representative of the sample. In computer computations, the spectral data generally is treated by matrix operations, in which the signal data is a vector and matrix filters are applied for the transformation. A typical computation system for Fourier transform is taught in the aforementioned textbook by P. R. Griffiths and J. A. de Haseth, particularly pages 81–120, incorporated herein by reference.

Conventional wavenumber calibration is carried out separately, for example with the spectral line of a built-in He—Ne laser validated with a known sample (such as polystyrene) and is not part of the present invention. This calibration generally is incorporated into the transformation computations.

Spectral data is designated herein by S which mathematically is a vector. For this data and for associated matrix factors and functions, a subscript "0" is for basic ("true") data for zero aperture stop size (not directly attainable), "M" is for measured data for any sample, "1" is for a standardizing (smaller) aperture stop, "2" is for an operational (larger) aperture stop, and "I" denotes idealized. A superscript "B" denotes a basic sample (for which fundamental spectral data is known), "C" denotes a standard sample, and "T" denotes a test sample which may be of unknown composition.

Computer operations for multiplication and division steps may comprise direct multiplication or division of vector and matrix elements, or may involve rapid computation techniques such as convolution, deconvolution or related procedures, which are available in commercial programs such as MATLAB™ sold by Mathworks Inc., Natick, Mass. As used herein and in the claims, the term "multiplication" and its corresponding symbol "*" for matrix operations means either direct multiplication or a related procedure such as convolution. Similarly the terms "ratio", "division" and the corresponding symbol "/" for matrix operations means either direct division or a related procedure such as deconvolution.

The intensity associated with any one wavelength in the interference beam from the interferometer is in the form a time-dependent sine wave representing the varying path length. The ends of the sine wave are truncated by the limits of the path change in the interferometer, e.g. the reflector rotation. Therefore, for better interpretation, data in current FTIR instruments are treated by multiplying the data vector by a matrix correction factor A, known as an "apodization" factor, representing a weighting function. The filter A is preselected by theoretical considerations as a mathematical function, for example in the form of a matrix representing a modified rectangle ("box car") in interferogram (time) space. The rectangle has a calculated width associated with the cutoff of the ends of a sine wave, known from the cycle limits of the interferometer mirrors. In wavenumber space A is a sinc function, i.e. $A=\sin(2\pi\sigma L_m)/(2\pi\sigma L_m)$ where $L_m$ is the maximum difference in optical path lengths of the split interfering beams in the interferometer.

Correction for the aperture distortion in FTIR is made conventionally by a J-stop function J which is applied together with a conventional apodizing factor A to relate measured spectral data $S_M$ to fundamental or true data $S_0$ by a formula $S_M=S_0*J*A$. The factor A should be the same for all instruments for which spectral information is being compared. If this is not the case, the factors should be related by a conversion factor $\phi$ such that $A_a=\phi*A_b$ where subscripts a and b denote different instruments, or the same instrument operating under different conditions, with different factors A. It further should be appreciated that selection of A is not critical to the present invention, as long as it remains the same or is converted.

As utilized with respect to the present invention, the factor A is applied to the initial spectral data within the same computational steps as the Fourier transform (FT) to effect the spectral data $S_M$ that is treated according to the invention. As used herein and in the claims, further reference to measured spectral data $S_M$ means such data after application of FT and the conventional (or other desired) apodizing factor A. Although preferably included with the FT, it is not critical where in the computational sequence the factor A (transformed if appropriate) is applied, and its inclusion in steps outlined below is to be considered equivalent to inclusion with the FT for the present purpose.

The aperture stop 22 may be an actual physical plate with an orifice therein, or a virtual aperture stop with a size determined by other elements in the optical train such as a lens (or mirror) diameter that establishes the diameter of the collimated section of the beam. Thus, as used herein and in the claims, the term "aperture" as depicted by the element 22 means an effective aperture that is either virtual or actual (physical). If two sizes of aperture are used as described below, the smaller may be a physical aperture, and the larger also may be physical or may be virtual with the plate removed.

The size of the aperture stop 22 in FTIR, known as a Jacquinot stop or "J-stop", is selected for normal operation to provide sufficient light for desired resolution in the spectral information, while being as small as otherwise practical to minimize distortion of the spectral beam due to finite size of the aperture and size and configuration of the light source as well as the sample. Hypothetical zero aperture stop would provide true or fundamental spectral data. The highest practical resolution, which is limited by the nature of the Fourier transform of the interference pattern, varies with instrument and, for example, may be 1 cm$^{-1}$ at 6530 cm$^{-1}$ for FTIR. (Units herein are wavenumber, i.e. reciprocal of wavelength; use of units of frequency would be equivalent, as would wavelength with appropriate conversion.) Such resolution typically is associated also with an aperture diameter of about 4.2 mm for an instrument with a focal length of 120 mm associated with the lens 23. Operation usually is carried out with a larger aperture size, for example 8.4 mm which can provide a resolution of 4 cm$^{-1}$ at a spectral wavenumber of 6530 cm$^{-1}$. The degree of distortion associated with the J-stop is proportional to the resolution. The different aperture stops may be fixed sizes and substituted, or a variable iris.

For the larger, operational aperture, a theoretical estimate for the function J often is not sufficiently accurate or comparable for different instruments. Therefore, the present invention is directed to applying another modification to the computations to improve accuracy and sensitivity. The modification recognizes that the spectrum of an infinitesimally narrow spectral line in FTIR actually has a line shape that is narrow with a finite width representing the resolution. To effect the modification, an ideal J-stop function $J_I$ is selected which specifies an idealized spectral line shape for a hypothetically sharp spectral line. The shape should approximate an intrinsic profile for the instrument. For FTIR the idealized J-function preferably has a nominally rectangular profile representing the resolution width. Idealized spectral data $S_I$ is defined by a formula $S_I = S_0 * J_I$. An objective of the present invention, for better reproducibity and sensitivity, is to determine the idealized data $S_I$ for a test sample, not the true data $S_0$.

The ideal J-stop function $J_I$ may be estimated according to optical theory, for example as a matrix representing a rectangle having a width proportional to wavenumber and related to aperture size. A rectangular ("box car") function for J is used ordinarily in FTIR instruments, for the reason that FTIR line shape (in wavenumber space) at the resolution limit is rectangular.

A standard sample is selected that preferably has at least one known, well defined spectral feature over the desired spectral range. The feature should be such that a change in shape is observable between the standardizing and operational apertures. The water vapor in air is suitable, so that uncontained air in the instrument simply may be used for the standard sample. Another type of standard sample is a gas such as methane and/or carbon monoxide contained in a cell. Yet another suitable sample is fine powder of the mineral talc, for example mounted in a 0.3 mm thick clear polyethylene sheet in a concentration suitable to produce a transmission of 25% to 35% for the 3676.9 cm$^{-1}$ line of the talc. Such mounting is achieved by melting the polyethylene containing the talc. The talc or other such standard sample should have adequate purity and morphology for spectral suitability. The fine talc powder is conventionally sized.

The standard sample is preliminarily measured with the instrument using the standardizing aperture, for example at the factory for a commercial instrument. The measured, standard spectral data $S_1^C$ for the standard is related to its true spectrum $S_0^C$ by $S_1^C = S_0^C * J_1$. The J-stop characterizing function $J_1$ for the standardizing aperture is determined in one of several ways: as a theoretical J-stop function or, preferably, with a standard sample with known basic (true) data $S_0^C$ or, alternatively, by way of a further, basic sample with known fundamental (true) data $S_0^B$. (The terms "true" and "fundamental" are used herein to distinguish between a standard sample and basic sample, and otherwise are equivalent.)

The standard sample also has an idealized spectrum $S_{I1}^C$ given by $S_{I1}^C = S_0^C * J_{I1}$ which is determinable from $S_{I1}^C = S_1^C * (J_{I1}/J_1)$. The function $J_{I1}$ is a preselected, idealized J-function conversion factor associated with the smaller aperture. This function preferably is utilized for reasons of numerical stability in the computations as explained below with respect to Eq. 1a. Also, as this function cancels out in the computations, its exact form is not critical. The two J functions and the standard spectral data are stored in a selected format whereby either $S_{I1}^C$ is computed and stored or (preferably) the components in its equation are stored permanently for the computer (e.g. on disk), for future application to test sample data during normal operation.

Further standardizing is done in association with operational use of the instrument, for example on a daily basis or more frequently so as to account not only for the specific instrument but also for instrumental drift such as may be due to temperature changes. This utilizes the same type of standard sample as for the preliminary steps described above, e.g. air (water vapor) or talc. It is preferable, but not necessary, to use the same actual sample, although any other sample should be consistent with the original in having the same spectrum. Spectral data $S_2^C$ is taken for such a standard sample with the operational aperture that is used for the ordinary operation with test samples. This generally is the conventional, larger aperture, e.g. 8.4 mm for resolution of 4 cm$^{-1}$ at 6530 cm$^{-1}$.

With the larger aperture, there are relationships similar to those set forth above for the smaller aperture. Thus, measured operational spectral data $S_2^C$ for the standard sample under the operational condition ("operational spectral data") are related to its true spectrum $S_0^C$ by $S_2^C = S_0^C * J_2$. This sample also has its idealized spectrum $S_{I2}^C$ given by $S_{I2}^C = S_0^C * J_{I2}$ so that its idealized spectrum is determinable from $S_{I2}^C = S_2^C * (J_I/J_2)$. The function $J_2$ is the characterizing J-stop function for the larger aperture. The idealized function $J_I$ is a second idealized function associated with the larger aperture (the subscript "2" being omitted), and is preselected. Another J-function relationship is $J_2 = J_{f1} * \delta J$, wherein the mathematical function $\delta J$ is another conversion factor, so that $$\delta J = S_2^C/S_{f1}^C = (S_2^C/S_1^C) * (J_1/J_{f1})$$

which is determined by the measured $S_2^C$ and the previously determined $S_{f1}^C$. A conversion factor F is defined as a ratio $F = J_I/J_2$, so that $$F = (J_I/J_1) * (S_1^C/S_2^C) \qquad \text{Eq. 1}$$

which can be computed from a preselected ideal $J_I$, the theoretical or otherwise determined $J_1$, and the measured $S_1^C$ and $S_2^C$. In a further selected format for storing, either this factor F is saved, or its components of the equation are saved, for application to data for test samples. (As used herein and in the claims, unless otherwise indicated, the terms "store" and "save" refer to either separate storing of such components as such or in one or more pre-computed relationships of the components to be used in computing the factor F.)

This equation is set forth in a simple form to show the basic relationship. However, for reasons of numerical stability in the computations, a function or spectral data having a larger width should be divided by one having a smaller width. Therefore, in this and the other equations herein, the computations should be carried out in a sequence that achieves this. For example, it is preferable to put the equation in the form:

$$F' = J_I / [J_1 * (S_2^C/S_1^C)]) \qquad \text{Eq. 1a}$$

A preferred sequence is to first calculate the mathematical function (ratio) $S_2^C/S_1^C$, multiply this by $J_1$, and then divide the result into $J_I$. For this reason, it is advantageous to save the instrument components $J_I$ and $J_1$ along with the standard data $S_1^C$ separately to go with the instrument. As $S_2^C$ is later obtained periodically with the operational condition, this also is saved or is immediately incorporated into a computation of F' which then is saved.

In ordinary operations of the instrument, spectral data $S_2^T$ are then obtained for one or more test samples using the operational aperture. For each test sample, idealized spectral data $S_I^T$ are computed from a further relationship $S_I^T = S_2^T * F$. This is the desired spectral information that is displayed, and is substantially independent of instrument (within a family of instruments) and of ordinary variations in an instrument.

For the theoretical approach, it is recognized that $J_1$ is based essentially on wavenumber resolution $\delta\sigma$ which in turn is dependent on aperture size and also is proportional to wavenumber $\sigma$. An aperture small enough for the resolution to approach interferometer resolution is selected as the smaller aperture for standardizing. The standard function $J_I$ for the standardizing aperture may be approximated theoretically (in a conventional manner) by a rectangle having a width $W = \beta^2 \sigma/8$ where $\beta = \sin^{-1}(d/f)$, d is the standardizing aperture diameter for that resolution, and f is the focal length of the lens 23 that focuses the interference beam onto the sample (e.g. d=4.2 mm and f=120 mm). In this case, a separate wavelength calibration may be performed and incorporated into the correction.

Although a theoretical value for $J_1$ may be used in Eq. 1, this J-factor generally will vary from instrument to instrument. A potentially more precise approach is to utilize a standard sample that has a known, predetermined "true" spectrum $S_0^B$. Such information is available for certain materials, particularly gases, from libraries of standards, for example in the database HITRAN™ of the United States Air Force Geophysics Laboratory as "USF HITRAN-PC" provided by University of South Florida, Tampa Fla. 33620, Version 2.0 (1992) supplimented by versions 2.2 (Aug. 30, 1993) and 2.41 (Aug. 18, 1995). A commercial database is available from Ontar Corporation, North Andover, Mass., which includes basic spectral data as well as program software for searching and plotting, and for correcting for pressure, temperature and path length using conventional theory (discussed in section 6.1 of the Version 2.0 text). Both of these databases are incorporated herein by reference.

An advantage is that this information is in computer format, eliminating the need to enter hard data. HITRAN information is available for methane and carbon monoxide gases which have spectral features (peaks across the selected spectral range) suitable for the present purpose. A standard sample is formed of a cell containing such a selected one or more such gases. The cell is formed, for example, of a quartz tube (e.g. 1 cm long, 22 mm diameter) with planar end windows that are non-parallel to prevent auxiliary fringes.

A measurement with such a gas cell may be used to omit the need for the $J_1$ function and any initial (factory) determinations with a smaller aperture, by using an equation $S_2^C = S_0^C * J_2$ where $S_0^C$ is known from a HITRAN database or the like. In this case the conversion factor becomes:

$$F'' = J_I/(S_2^C/S_0^C) \qquad \text{Eq. 2}$$

For reasons given previously, a preferred sequence is to effect the parenthetic ratio first. The idealized data $S_I^T = S_2^T * F''$ is then computed as indicated above. This sequence is particularly suitable with the fundamental spectral data $S_0^C$ having a known profile. Also, especially for FTIR, logarithmic steps are advisable where the width of the idealized function $J_I$ for spectral line shape is proportional to wavenumber as set forth elsewhere herein as explained below.

There is no standardizing condition with corresponding standardizing data in the aspect of Eq. 2, this being replaced by fundamental data. For the purpose of a generic term, the word "calibribration" herein encompasses standardizing and fundamental with respect to spectral data. Standardizing refers to a condition such as a finite aperture that allows practical measurement, and fundamental refers to a hypothetical condition such a zero aperture.

It may not be desirable or practical to utilize such a gas cell for the standard sample measurement under operational conditions. In this case a more usable standard such as talc may be used, and a further, basic sample such as a cell of methane and carbon dioxide having predetermined fundamental spectral data $S_0^B$ is used for an initial calibration (e.g. at the factory). The precise data for $S_0^B$ is obtained, and corrected for pressure and temperature, from information included in the HITRAN database.

This data is saved in a selected format, either as a ratio or preferably separately for future use.

The instrument is initially operated with this basic sample with the smaller aperture to obtain basic spectral data $S_1^B$ for the basic sample. This data is saved along with the other information for F in a further selected format, i.e. either separately or combined with one or both of the data sets for the standard sample. For F, the calibration filter $J_1$ is established by the relationship $J_1 = S_1^B/S_0^B$.

In this case the transformation function becomes:

$$F'''=J_I/(S_1^B/S_0^B*S_2^C/S_1^C) \qquad \text{Eq. 3}$$

For reasons given previously, the computations may not actually be effected in the order shown. A preferred version, which also preferably utilizes the additional components $J_1$, $J_{f1}$, and $S_{f1}^C$ which are explained above, is:

$$F'''=J_I/[J_{f1}*(S_2^C/S_1^C)] \qquad \text{Eq. 3a}$$

where $S_{f1}^C=S_1^C*J_{f1}/J_1$). Computational sequence is determination first of $J_1=S_1^B/S_0^B$, then ratio $J_{f1}/J_1$, $S_{f1}^C$, the ratio $S_2^C/S_{f1}^C$, the multiplication with $J_{f1}$, and the final division into $J_I$. For this, $J_{f1}$, must also be preselected. The idealized data $S_I^T=S_2^T*F'''$ is then computed as indicated above. It is convenient to predetermine and store $J_1$ and $J_{f1}$, or $J_1$ and $J_{f1}/J_1$, as well as $S_{f1}$, and provide these components with the instrument.

It may be noted that mathematically $J_{f1}$ cancels out in Eq. 3. However, this component is useful for maintaining numerical stability in computing the matrix ratios (deconvolutions) in the sequence. As previously indicated, a function or spectral data having a larger width should be divided by one having a smaller width. Thus $J_{f1}$ should have a FWHM significantly greater than that of $J_1$, e.g. 1.5 cm$^{-1}$ for a $J_1$ of 1.0 cm$^{-1}$ at 6530 cm$^{-1}$. Similarly, $J_I$ should have a FWHM greater than that of $J_2$, e.g. 4 cm$^{-1}$ at this wavenumber.

As indicated above, it is not necessarily desirable to actually save or compute the conversion factor F (or F' or F'' or F'''), as for computational sequencing it may be advantageous to save its component vector and matrix data separately, or in computed sub-units, and apply several matrix operations at the time of test sample computations. Therefore, reference to this conversion factor in the claims is to be interpreted as equivalent to its components with respect to storage and computations. (The factors F', F'' and F''' collectively may be termed F hereafter and in the claims, as they all are specified by or derived from Eq. 1 depending on which components are known.)

Figure 3:
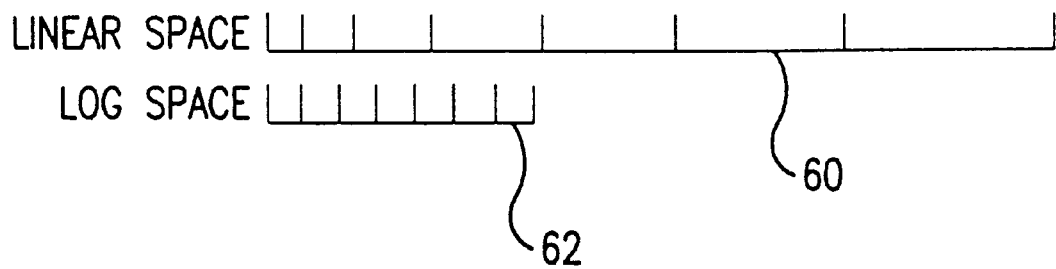
FIG. 3 illustrates scales utilized for data in the invention.

In the case of FTIR, the resolution $\delta\sigma$ attributable to the effects of the aperture is proportional to the wavenumber $\sigma$, such that $\delta\sigma/\sigma$ is a constant c. Therefore, the J functions are also proportional to the wavenumber and would require a series of such functions and computation across the spectral range, thus complicating the computations and selection of a function. To account for this according to a preferred embodiment of the invention, the wavenumber axis of the measured spectral data is transformed into logarithmic space where the resolution is independent of wavenumber. This advantageously is achieved by first defining a scale in linear space (FIG. 3), wherein the unit spacing 60 is proportional to wavenumber for the original data. The original data is interpolated into the scaled points. Two conventional ways are Lagrange interpolation and interpolation with truncated sinc functions (approximating massive zero padding FT interpolation). Corresponding points 62 in logarithm space will result in equal J width (independent of $\sigma$).

The mathematics of the scaling involves the concept that the width in log space is $W_L=\log[(\sigma-\delta\sigma)/\sigma]=\log(1-c)$ which is a constant. The conversion puts each data point at an edge of an increment, so in a further step the axis is shifted so as to center the data properly to represent absolute wavenumber position. The preferred sequence of steps is scaling (interpolation), logarithm and center-shift, but these may be combined into one matrix.

The linear data are then converted into logarithm data by conventional computer matrix procedures into the logarithm space by taking a logarithm ("log", e.g. base 10 or base e) of the original data. In the log space the points are uniformly spaced with the equal resolutions. Preferably more points are used in log space than linear space, e.g. 4 or 5 times more. The number of points in log space is conveniently rounded to a power of 2; e.g. 256 points from 40 in linear.

Figure 4:
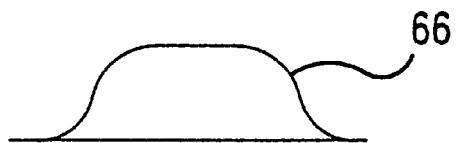
FIG. 4 shows a shape of a factor utilized in computations of the invention.

The above spectral data S are converted into the log space after A is applied in linear space. The filter is calculated in log space and is applied to the data via the factor F. A problem is that a rectangular function with sharp corners, being the basic form of J in ordinary space, cannot be converted sufficiently by logarithm. Therefore, this function is modified to a form 66 (FIG. 4) having rounded upper corners and tails at the lower corners formed of a rectangle multiplied with a smooth, symmetrical function such as a small Gaussian. The exact form is not critical as the choice of the ideal function $J_I$ is arbitrary provided it is reasonably close to actual line shape. For this function, the starting rectangle width is $\delta\sigma=1$ cm$^{-1}$, and for its Gaussian $\delta\sigma=1.5$ cm$^{-1}$ (both at $\sigma=6530$ cm$^{-1}$ before conversion to log space), to effect a profile with full width at half maximum (FWHM) slightly greater than 1 (at $\sigma=6530$ cm$^{-1}$). For the apodization A, a suitable FWHM for the sinc function is 0.6 cm$^{-1}$ at 1 cm$^{-1}$ J-stop. The functions for $J_I$ and A are normalized to unit area.

When the computations for idealized data $S_I^T$ are carried out in log space, these data are then converted and re-interpolated by conventional antilogarithm and Lagrange (or other) procedures back to linear space to determine the final spectral information that is displayed. In matrix form the computation for the idealized spectral information $S_I^T$ to be presented is $$S_I^T=D_2*L*F*L' \qquad \text{Eq. 4}$$

where $D_2$ represents preliminary, pre-logarithm data for a sample (after Fourier transform), L includes a conventional logarithm filter, F is determined according to Eq. 1, and L' includes the reverse logarithm matrix. The logarithmic filter also includes interpolation, axis scaling and centering, and the reverse matrix also includes reverse interpolation and axis scaling. (A further centering shift is not necessary in reverse.) Each of the data sets in F is already in logarithm form, as a result of logarithm conversions before being applied in the computations of the Eqs. 1 through 3a that are relevant.

A flow chart (FIG. 5) with reference to Eq. 3a illustrates the procedures for the case of using a standard sample together with a basic sample having predetermined fundamental spectral data. Items in the chart represent computational steps or computer means for effecting computations and saving. Although each computational element (data vector or matrix function) is shown to be separately stored or saved, as pointed out above some of the components may be combined by multiplication (or convolution) and stored as a single matrix or vector. Thus, herein and in the claims, successive convolutions and deconvolutions by such components are considered equivalent to direct multiplication by a combined factor F'''.

Initially the selected idealized functions $J_{f1}$ and $J_I$, and the apodization factor A (if utilized), are determined and stored 68, 70, 71. The basic data $S_0^B$ for the basic sample also are stored 72. This stored basic data has been derived as necessary from the published data $S_{f1}$ (HITRAN or the like) by apodizing 76 with the apodization factor via $S_{f1}*A$. The stored basic data also has been interpolated 78, and logarithm applied and axis shifted 80.

Also initially (generally at the factory), the instrument is operated 82 to obtain signal data for the basic sample 84 using the small, standardizing aperture. The Fourier transform (FT, which preferably includes initial conventional wavenumber calibration and application of apodization A) is applied 86 to the signal data to effect initial basic spectral data $D_1^B$. The transformed data are interpolated 78 to a scale proportional to wavenumber. The logarithm matrix is then applied 80 with axis-shifting to center the points. The resulting standard spectral data $S_1^B$ are stored 88.

Similarly (e.g. initially at the factory) the instrument is again operated 82 to obtain spectral data for the standard sample 90 using the same standardizing aperture. The FT is applied 86 to the signal data to effect initial standard spectral data $D_1^C$ for this sample. This transformed data are interpolated 78, and the logarithm matrix is applied 80 with axis-shifting. The resulting standard spectral data Slc are stored 92.

In the ordinary location and situation of utilizing the instrument, the larger operational aperture is used, although the initial standardizing steps (above) also can be performed in this location. At least initially, and preferably periodically, the instrument is operated 94 again to obtain spectral data for the same standard sample 90 (or another of the same material) using the operational aperture. The FT is applied 86 to the corresponding signal data to effect initial spectral data $D_2^C$ for this sample with the larger aperture. The transformed data are interpolated 78, the logarithm matrix and shifting are applied 80. An instruction is provided 96 by an operator (or automatically with selection of the standard sample) that this is the standard sample, and the resulting operational spectral data $S_2^C$ is saved 98. At this point all components for the factor F (actually F''' of Eq. 3) are available.

As pointed out above with respect to Eq. 3a, there is a preferred sequence in the computations for relating components into the factor F'''. The function $J_1$ is computed 100 first from data of the basic sample, and then the ratio $J_{f1}/J_1$ is computed 102 from the preselected $J_{f1}$. Next the intermediate relationship $S_{f1}^C = S_1^{C*}(J_{f1}/J_1)$ is computed 104 from this ratio and the standard data $S_1^C$. The foregoing constitutes data that is stored permanently for the instrument, e.g. in a disk. The components that advantageously are stored are $S_{f1}^C$ and $J_{f1}$ or $S_1^C$ and $J_1$.

When the operational data $S_2^C$ are obtained 98, the ratio $S_2^C/S_{f1}^C$ or alternatively $S_2^C/S_1^C$ is computed 108. Then the multiplication with $J_{f1}$ or alternatively $J_1$ is computed 106 and, finally, the factor F''' is computed 110 and saved 112 for routine use.

The instrument is operated 94 on one or more test samples 114 to obtain normal signal data for each test sample using the operational aperture. The FT is applied 86 to the signal data to effect initial spectral data $D_2^T$. The transformed data are interpolated 78, and the logarithm matrix with shifting is applied 80. Lacking specific designation 96 as standardizing, the resulting spectral data $S_2^T$ are saved 116 as test data. The previously stored transformation function F''' is applied 118 to this test data, to yield a logarithmic form of the idealized spectral data $S_f^{T'}$ for the test sample. The antilogarithm matrix is applied 120, then reverse interpolation is computed 122, to provide the final idealized spectral information $S_f^T$ which is displayed 124 for the test sample.

Similarly (FIG. 6), if a theoretical value for the filter $J_1$ is used, this is saved 126 and utilized in the function F' (Eq. 1a) in place of data for a basic sample. For sequential computation, the ratio $S_2^C/S_1^C$ first should be computed 128, and then its multiplication with $J_1$ is computed 130. From this and $J_f$, F' is computed 132. As all other relevant steps are the same or substantially the same as for FIG. 5, the flow sheet incorporates rest of the numeral designations the same as described above for FIG. 5.

A simpler procedure (FIG. 7) is used for the case in which the true spectral data $S_0^C$ for the standard sample is predetermined, for example for a methane and carbon dioxide cell with HITRAN data. In this case the series of steps with a basic sample is omitted, and the true spectral data is stored 72 (after having been interpolated, logarithm applied and shifted). The ratio with $S_2^C$ is computed 134 and utilized with $J_f$ for computation 136 of the factor F'' of Eq. 2. As other relevant steps are the same or substantially the same, the flow sheet incorporates the same remaining numeral designations as described above for FIGS. 5 and 6.

Figure 8C:
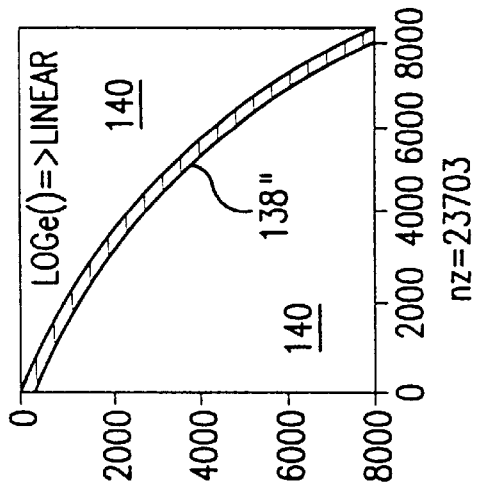
FIGS. 8a, 8b and 8c are schematic diagrams of matrices representing filters for operating on spectral data in the instrument of FIG. 1.
Figure 8B:
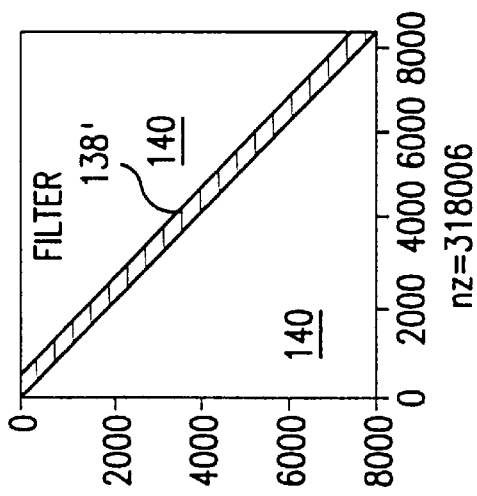
Figure 8A:
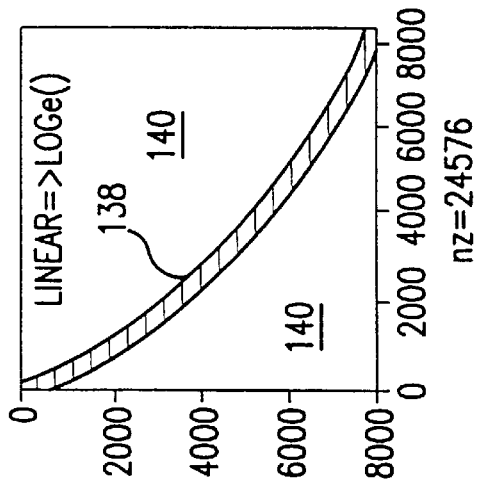

The three major filters L, F and L' are respectively in the form of bands 138, 138', 138" as illustrated in FIGS. 8a, 8b and 8c. The matrix elements 140 outside the bands are zero. (The designation "nz" is number of zeros in the matrix.) For the filters L and L', the respective logarithm and antilogarithm matrices are conventional, being implemented in computational programs such as the aforementioned MATLAB. This matrix includes Lagrange (or other) interpolation which may be obtained from the MATLAB program, among others. The axis scaling and shifting are also included and readily implemented by selecting points with the spacing and shifting. The matrices for logarithm, interpolation, scaling and shifting may be combined into a single filter L or applied individually. Similarly, the matrices for antilogarithm, interpolation and scaling may be combined into a single filter L' or applied individually. The filter F is a matrix determined from Eq. 1. The numbers in each band of the three matrices are generally close to one except rounding at the corners and tailing to zero near the edges.

Figure 9:
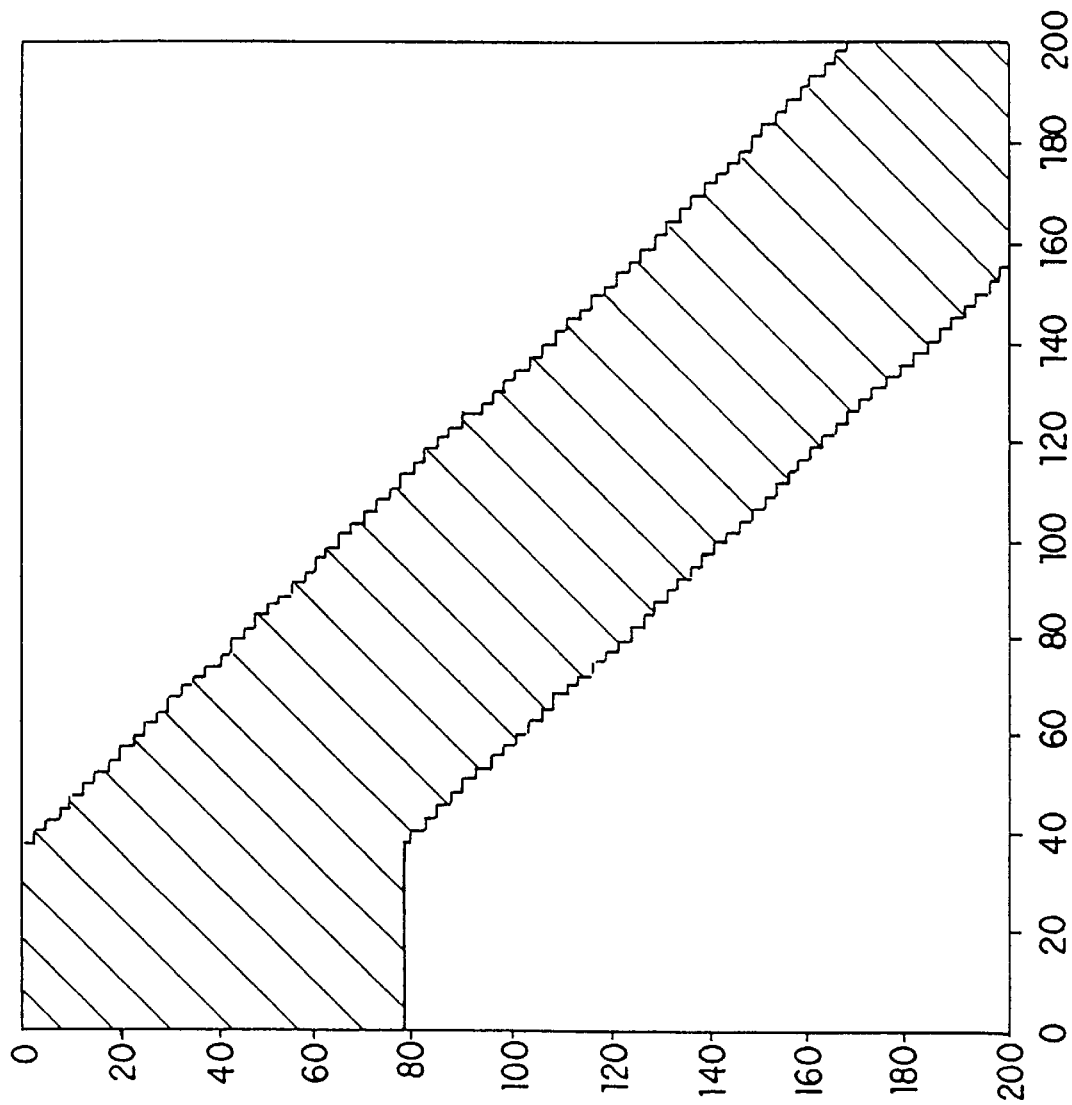
FIG. 9 is a portion of the diagram of FIG. 8b.

FIG. 9 shows an upper portion of the combined matrix L*F*L', showing spreading that results from the convolution of the matrices of FIGS. 8a–8c. The spreading at the top is due to the opposite "curvatures" of the matrices of FIGS. 8a and 8c. Care should be exercised in deconvolution with small numbers approaching zero, as enormous numerical noise can be introduced into the results from division by very small numbers. This is achieved by eliminating very small numbers in FT space (after Fourier transform and before logarithm), e.g. those smaller than 1% of the largest number.

Figure 10:
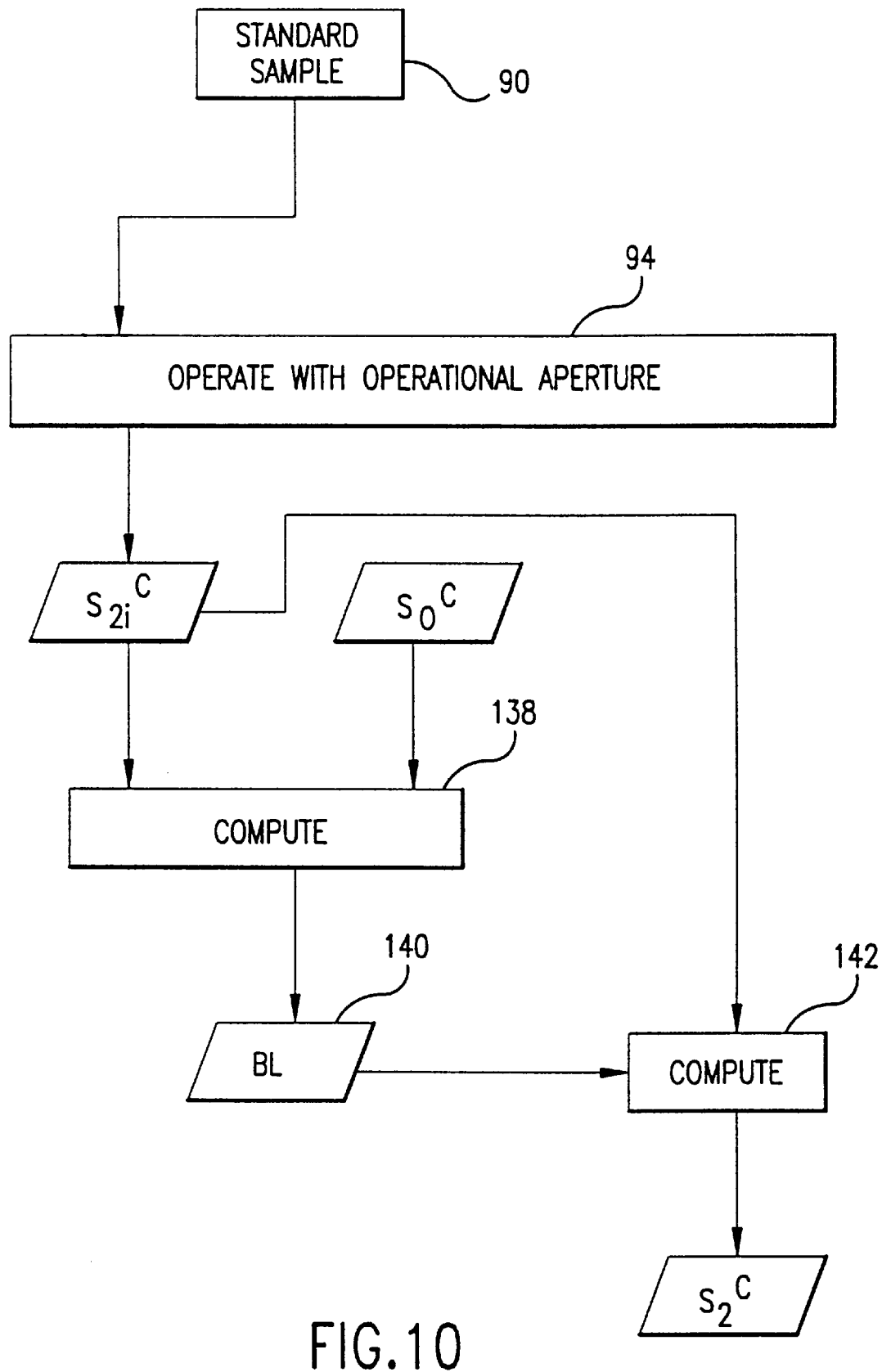
FIG. 10 is a flow chart for determination of a component of spectral data in the charts of FIGS. 5–7.

The published data used for the true (i.e. fundamental or basic) spectral data, although corrected for pressure and temperature, has no corrections for incidental absorptions and reflections that occur in the use of a cell with the corresponding sample gas. Such incidental contributions effectively result in a shift of the baseline, i.e. the vertical level of the horizontal wavenumber axis relative to the transmission data. It is advantageous to compensate for this shift. Using the case of FIG. 7 and Eq. 2 as an example, a way of compensating is to obtain spectral data $S_{2i}^C$ (FIG. 10) for the standard sample gas 90 with the operating condition 94, where the subscript "i" designates that this is generally in an initial situation such as at the factory.

A horizontal baseline $BL=[(S_{2i}^C/S_0^C)/(1/S_0^C-1)]_{av}$ is computed 138 where the subscript av designates averaging over the the selected wavenumber range for the spectral data. The computed baseline is stored 140, and then it is applied back to $S_{2i}^C$ to compute 142 corrected standard spectral data $S_2^C$ with a formula $S_2^C=(BL-S_2^C)/BL$. This computation also incorporates a conversion related to the fact that the present instrument provides transmission data if the published (e.g. HITRAN) data is absorption-type data. This corrected data is the $S_2^C$ that is stored and utilized in the computation of the transformation function F. Although a horizontal, linear baseline detemined as above should be sufficient, more generally the baseline is a function computed from the initial spectral data and the true spectral data with a conventional or other desired procedure.

Figure 5:
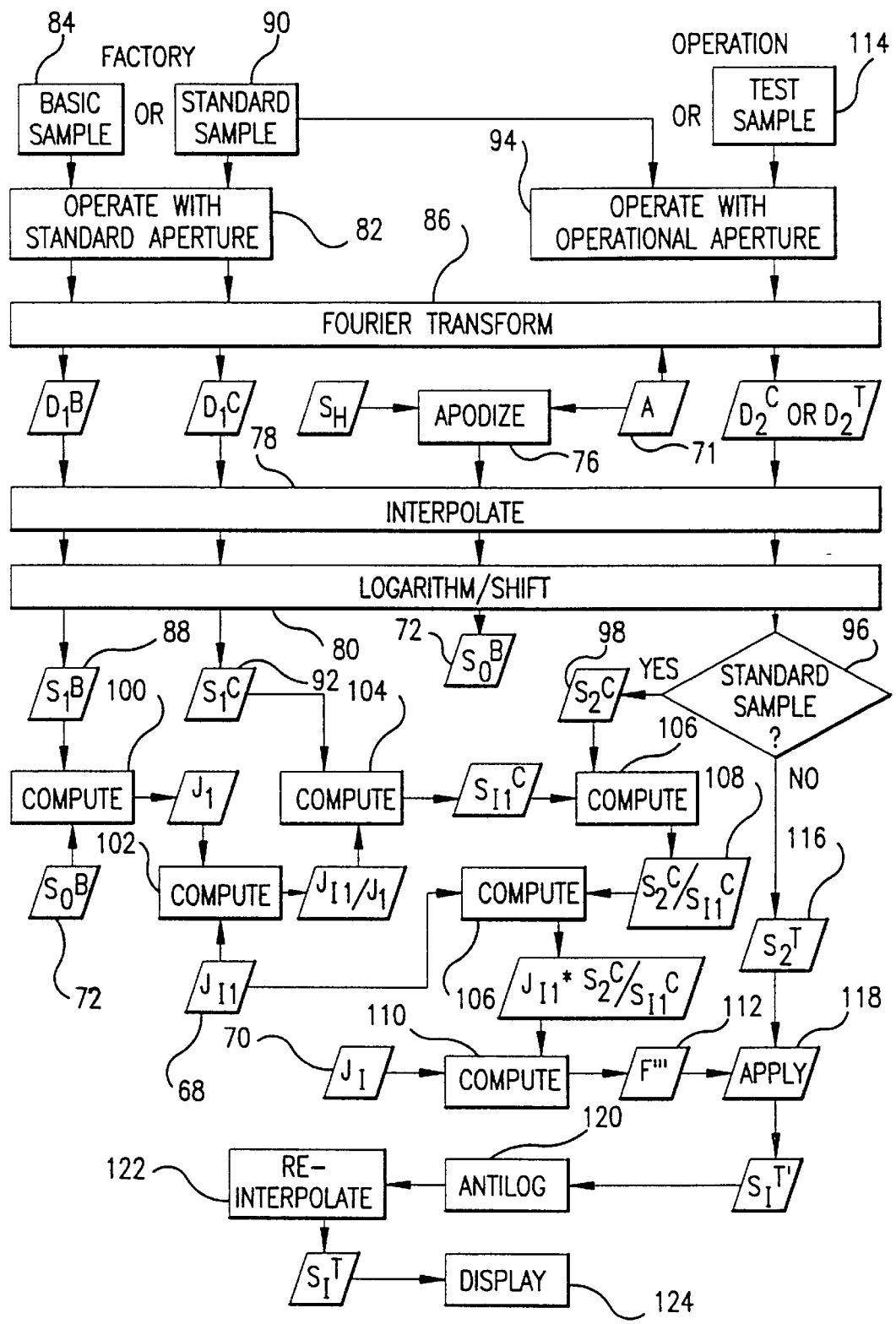
FIG. 5 is a flow chart for a first embodiment of means and steps for computational aspects in the instrument of FIG. 1.

The same type of correction is made for the case of FIG. 5 where a basic sample is used. The data $S_0^B$, $S_{2i}^B$ and $S_2^B$ are substituted respectively for $S_0^C$, $S_{2i}^C$ and $S_2^C$. More broadly, the data associated with the sample with known fundamental data are used to make the baseline correction.

The accuracy of a computational structure of the present invention for standardizing spectral information may be checked by a comparison of data for a basic sample. Measurement is made with the operational condition to obtain data which is baseline corrected (as above) to effect measured spectral data $S_2^C$ for the standard sample having known true data (e.g. FIG. 7). Standardized spectral information $S_I^C$ for this sample is determined from the relationship $S_I^C = S_2^C * F$, with (if otherwise used) apodization, intervening interpolation, log and shift, and then antilog and re-interpolation.

Corresponding hypothetical spectral information $S_H^C$ are computed from the fundamental data by $S_H^C = S_0^C * J_I$, the subscript "H" referring to hypothetical. Apodization (if used) also is applied to the latter computation, so that the actual latter formula is $S_H^C = S_0^C * A * J_I$. The spectral information $S_I^C$ and $S_H^C$ are compared, either by presentation of the two sets of data for observation, or preferably by calculation of the differences across the wavenumber range. In an example comparison, using the specific instrument and conditions referenced herein, it was found that the differences were less than 3%.

A computer readable storage medium 35 (FIG. 1) such as a hard disk of the computer, or a portable medium such as a floppy disk, CD-ROM or tape is advantageous for use with the instruments described herein. The disk (or other storage medium) has data code and program code embedded therein so as to be readable by the computing means. With reference to FIG. 5, the data code includes at least the idealized function $J_I$ for spectral line shapes, and standard spectral data $S_1^C$ obtained for a standard sample with the standardizing condition. If used, the further idealized function $J_{I1}$ also is included. The program code includes means for establishing the standard function $J_1$ that relates the standard spectral data to the true spectral data, and means for relating the idealized function, the standard function, the standard spectral data and the operational spectral data $S_1^C$ (for the standard sample with the operational condition) with the transformation function F (F''' in Eq. 3 or 3a and FIG. 5). The program code further includes means for computing standardized spectral information $S_I^T$ for the test sample corrected for the intrinsic distortion by application of the transformation function F to test spectral data obtained for a test sample with the operational condition.

Figure 6:
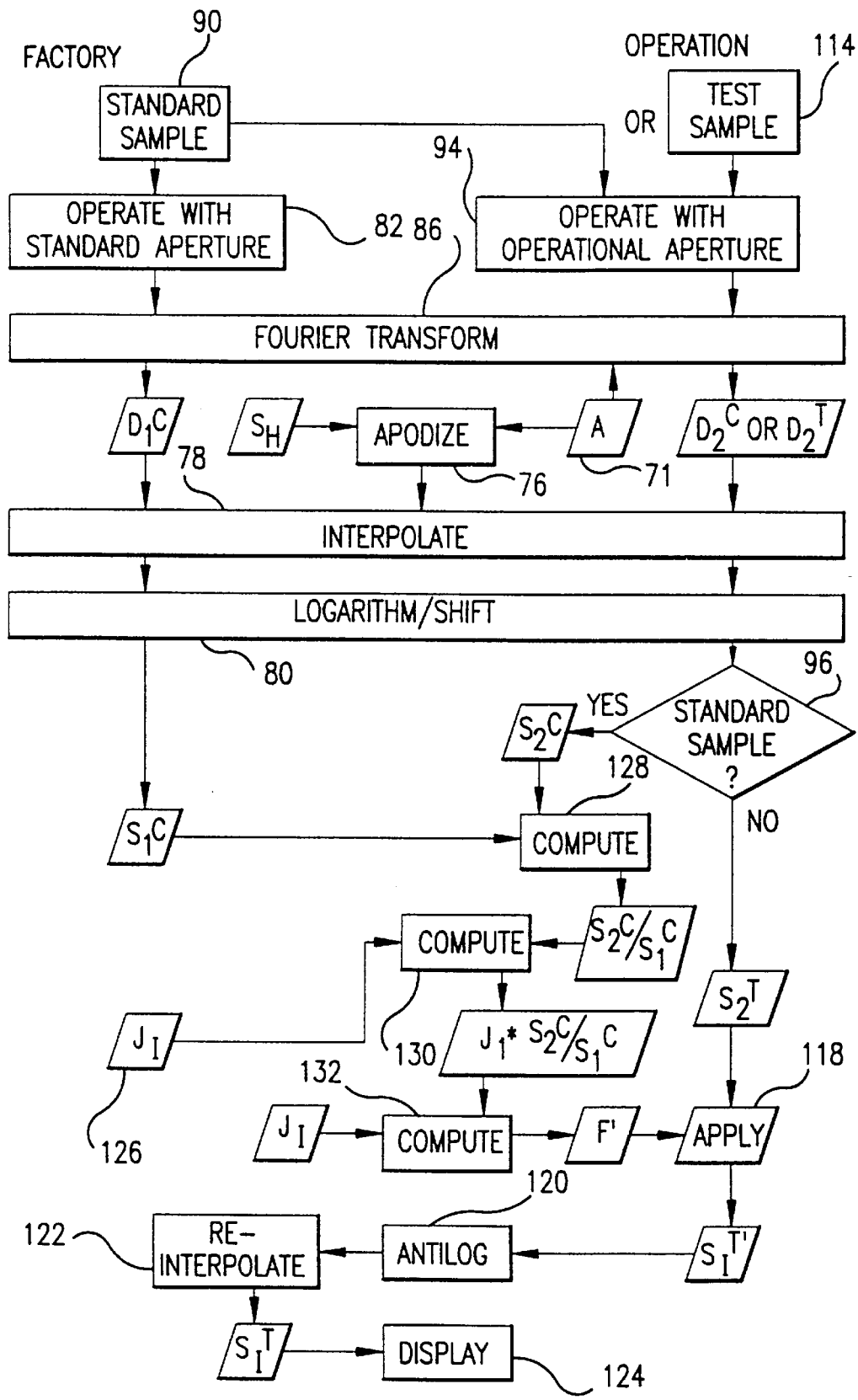
FIG. 6 is a flow chart for a second embodiment of means and steps for computational aspects in the instrument of FIG. 1.

The stored means for establishing the standard function $J_1$ may be theoretical, as with FIG. 6 and Eq. 1a, in which case the stored means comprises the theoretical formula; or, intended as an equivalent in the claims, a precomputed theoretical $J_1$ is included in the data code. Alternatively the stored means may utilize basic sample data $S_0^B$ and $S_1^B$ as set forth in Eq. 3a with respect to FIG. 5. In the latter case, $S_0^B$ is also stored on the floppy disk after having been apodized, interpolated, logarithm applied and shifted as explained above.

Figure 7:
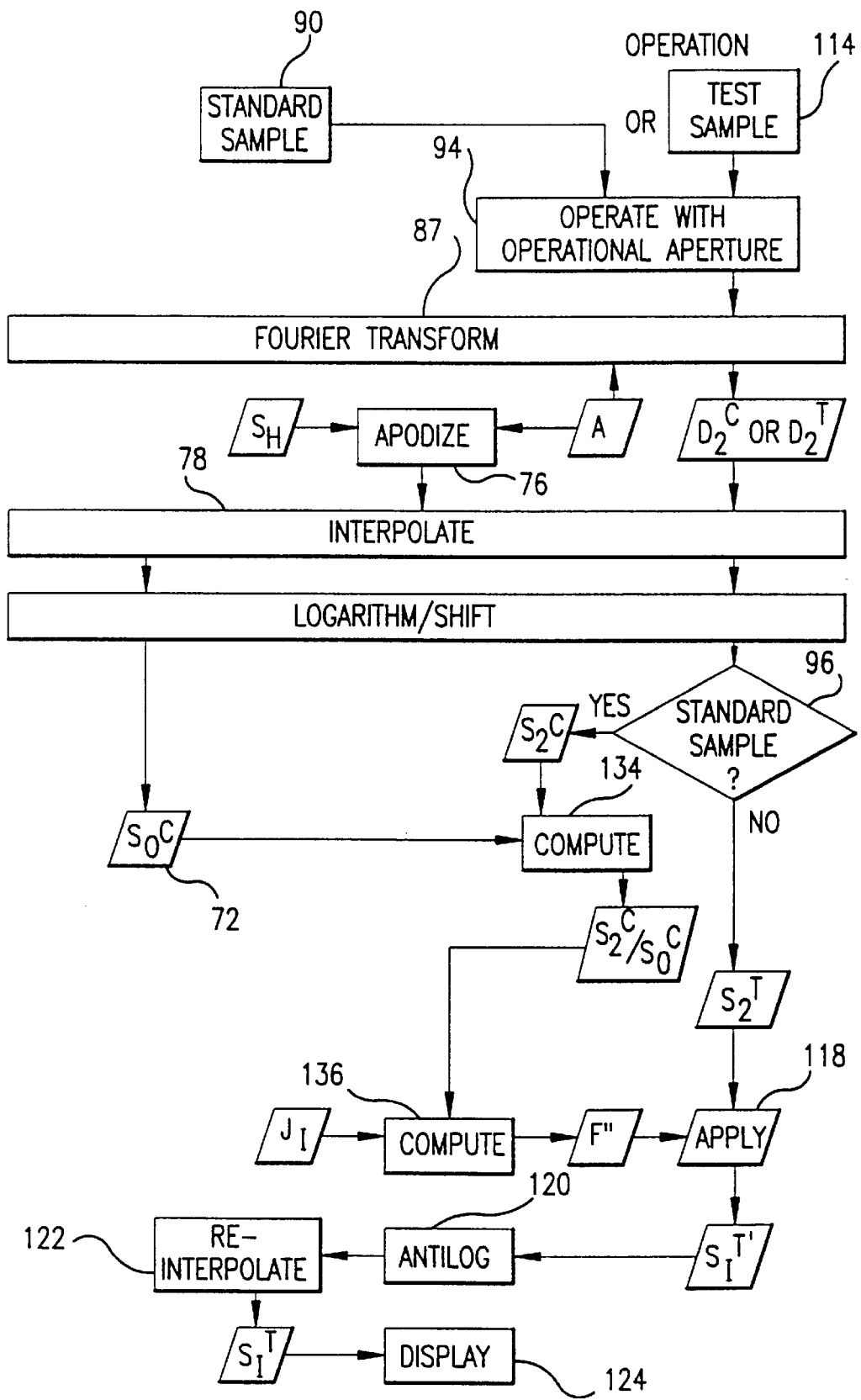
FIG. 7 is a flow chart for a third embodiment of means and steps for computational aspects in the instrument of FIG. 1.

In another embodiment, with functional means represented in FIG. 7, the disk is set up for the case in which the standard sample has known fundamental data. In such case, the data code includes an idealized function $J_I$ for spectral line shape, and fundamental spectral data $S_0^C$ for the standard sample. The program code includes means for relating the idealized function, the standard spectral data and the operational spectral data $S_2^C$ with a transformation function F (F'' in FIG. 7). The program code further includes means for computing standardized spectral information $S_I^T$ for the test sample corrected for the intrinsic distortion by application of the transformation function F to test spectral data obtained for a test sample with the operational condition.

A floppy disk (or other portable storage medium) may be provided with certain minimal data for use by an instrument already having the programming means and certain data functions incorporated into the instrument computer (e.g. hard disk). In such a case, the data code includes an idealized function $J_{I1}$ for spectral line shape associated with the standardizing condition, and standard spectral data $S_{I1}^C$, obtained for a standard sample with the standardizing condition. Alternatively, the data code include $J_1$ and $S_1^C$. The idealized function and the standard spectral data have the aforedescribed cooperative relationship for application to test spectral data obtained for a test sample with the operational condition. A direct relationship is $S_1^C/J_1$; however, a preferred relationship is $S_{I1}^C = S_1^C * (J_{I1}/J_1)$, where $J_{I1}$ is a second idealized function as set forth above, which is a component in the sequence of computations for F. Either of these relationships may be precomputed and stored on the disk but, as indicated previously, the components are preferably kept separate on the disk to allow the preferred computational sequence. Such data on a separate disk is useful for updating or changing the standard sample for an instrument that already incorporates the invention.

In a further embodiment, a floppy disk or other storage medium is provided for use in standardizing spectral information in a spectrometric instrument that includes logarithmic transformation in the standardization as described above. The disk has data code readable by the computing means of the instrument, wherein the data code comprises fundamental spectral data for the basic sample. The fundamental spectral data is in a form 72 (FIG. 5) that is apodized, interpolated, logarithm applied and axis shifted. The fundamental data may also be in such a form for a standard sample having such data (FIG. 7, Eq. 2). This disk is useful for providing updated or replacement fundamental spectral data to an instrument already incorporating a standardization, and is particularly useful with the data being in a directly usable form.

Figure 11:
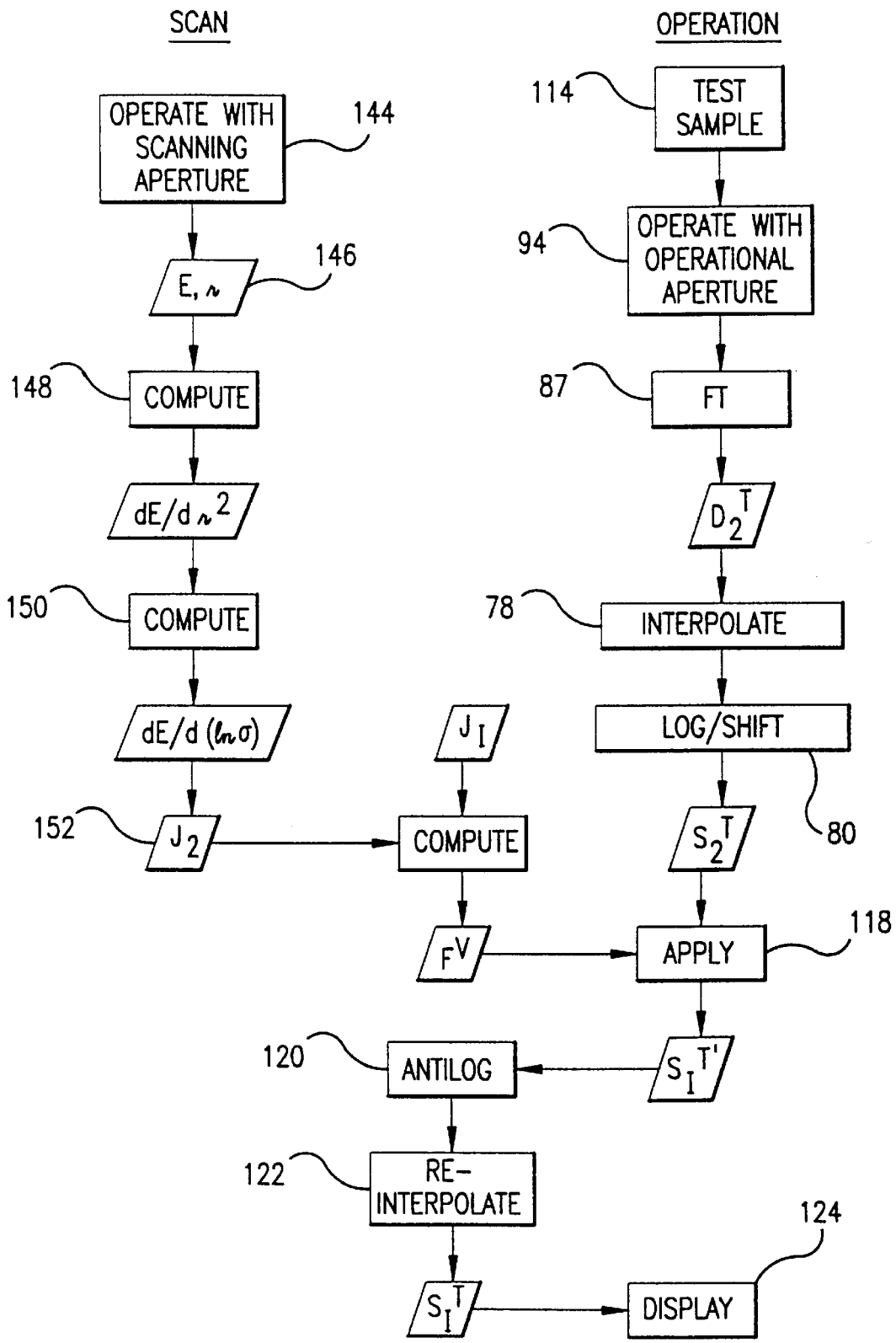
FIG. 11 is a flow chart for a further embodiment of the invention.

A further embodiment (FIG. 11) omits the need for any standard or basic sample (except for conventional calibration purposes outside the purview of the invention). This utilizes the J-stop function $J_I = S_2^C/S_0^C$. From Eq. 2 the transformation function is restated as:

$$F^v = J_I/J_2 \qquad \text{Eq. 5}$$

Figure 2:
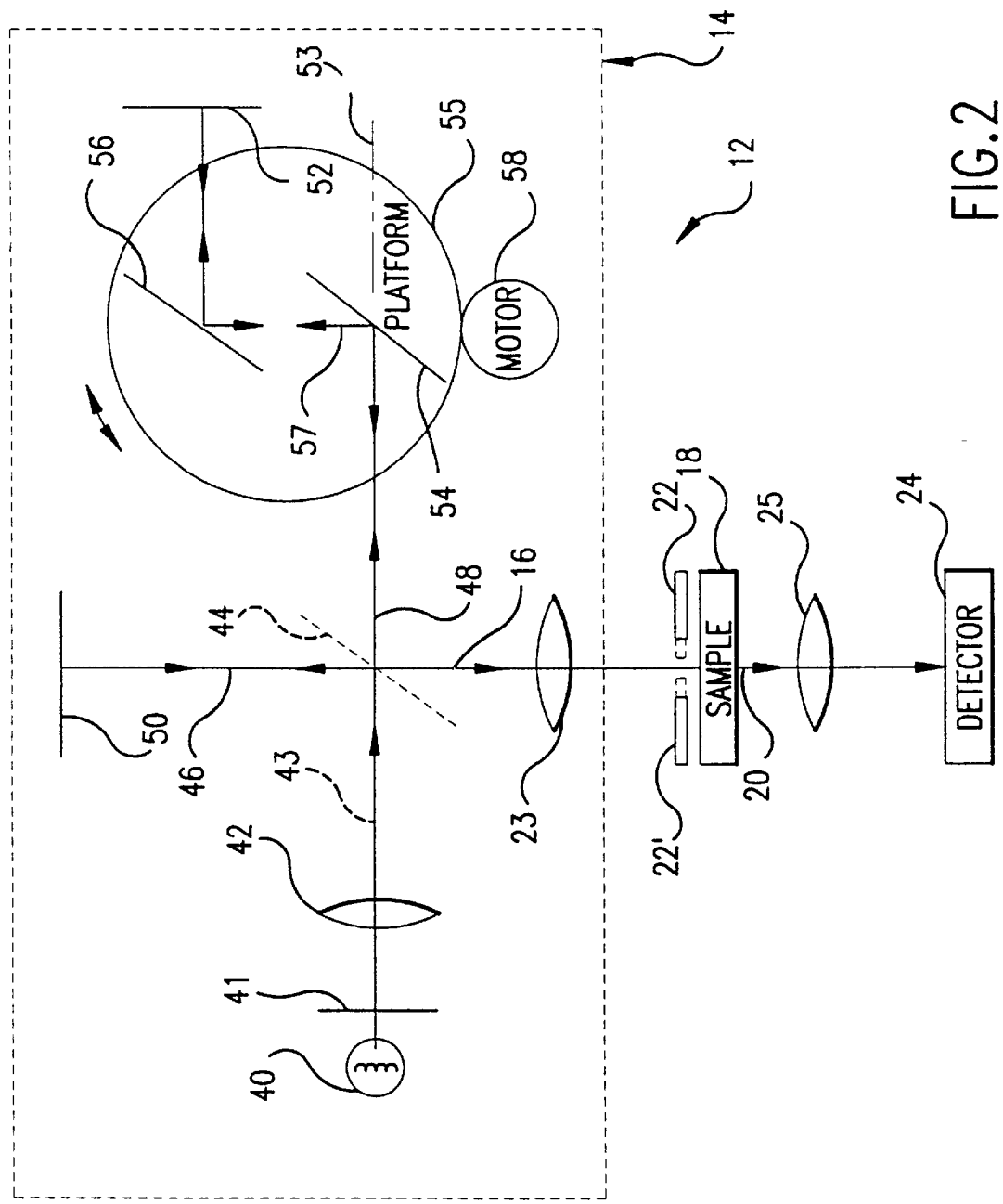
FIG. 2 is an optical diagram of a component utilized in the instrument of FIG. 1 for generating an interference spectrum.

The idealized function $J_I$ is specified as explained above. A technique for determining $J_2$ in log space is to operate 144 the instrument with or without a sample to yield a series of measurements 146 of energy data E collected by the detector for a set of J-stop aperatures having different aperture sizes of radius r. The instrument should be operated under conditions intended for its use. The aperture should be varied in a series ranging from the smallest to the operational size, preferably spaced at equal intervals in terms of $r^2$. Two such aperture sizes 22, 22' are shown in FIG. 2. Wavenumber and other parameters of the energy band are not important except for maintaining these constant in the measurement series. A sample is not necessary but may be in place. The energy E is an energy total, for example being either the entire total or a centerburst of the interferogram which may be detected with step changes in aperature size. Alternatively, with a fixed beam the aperture size may be scanned rapidly as with an iris, with a continuous measurement of energy E without recourse to an actual interferometric scan. From the data 146 a derivative of the energy with respect to aperture size, preferably $dE/dr^2$, is computed 148 conventionally.

A derivative of energy with respect to wavenumber $\sigma$ is desired, preferably in log space for reasons set forth above. Thus converting to a derivative $dE/d(\ln\sigma)$ is advantageous. Light of true optical wavenumber $\sigma_0$ passing through a J-stop aperature having radius r is incident in the interferometer at an angel $\theta$ relative to the central ray such that $\tan\theta = r/f$ and a wavenumber spread is given by $\sigma = \sigma_0 \cos\theta$ where f is the focal distance defined above. From these relationships and interpolation for the logarithm, a relationship for the J-stop function $J_2$ is computed 150.

$$J_2 = dE/d(\ln\sigma) = -2f^2(dE/dr^2) \quad \text{Eq. 6}$$

where $\sigma = \sigma_0(1 - r^2/2f^2)$, and the negative sign indicates that lineshape broadens to lower frequency as the J-stop is opened. It may be noted that $\sigma_0$ is not specified and can be arbitrary as there is no significant dispersion of optical frequency across the J-stop in a properly designed instrument. The function $J_2$ is stored 152.

As in previous embodiments, the instrument is operated 94 on one or more test samples 114 to obtain normal signal data for each test sample using the operational aperture. The Fourier transform (FT) is applied 86 to the signal data to effect initial spectral data $D_2^T$. The transformed data are interpolated 78, and the logarithm matrix with shifting is applied 80. The resulting spectral data $S_2^T$ are saved 116 as test data. The previously stored transformation function $F^v$ of $J_1$ and $J_2$ (Eq. 5) is applied 118 to this test data, to yield a logarithmic form of the idealized spectral data $S_I^T$ for the test sample. The antilogarithm matrix is applied 120, then reverse interpolation is computed 122, to provide the final idealized spectral information $S_I^T$ which is displayed 124 for the test sample.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. A method of standardizing spectral information for a sample in a spectrometric instrument that effects an intrinsic distortion into spectral data, the instrument including an optical train with spectral means for effecting a spectral beam responsively to a sample such that the spectral beam is characteristic of the sample, detector means for detecting the spectral beam to effect signal data representative thereof, computing means receptive of the signal data for computing corresponding spectral information representative of the sample, and display means for displaying the spectral information, the optical train including an optical component selectively having a standardizing condition or an operational condition, such condition having the intrinsic distortion associated therewith, and the sample being selectable from a sample set including a test sample and one or more standard samples formed of a substance having true spectral data, wherein the method comprises steps of:

specifying an idealized function of spectral line shape for a hypothetically sharp spectral line, obtaining standard spectral data for a standard sample with the standardizing condition, establishing a standard function that relates the standard spectral data to the true spectral data, and storing the idealized function, the standard spectral data and the standard function in a selected format for future application to test spectral data to effect standardized spectral data.

2. The method of claim 1 further comprising obtaining operational spectral data for a standard sample with the operational condition, and storing the operational spectral data for inclusion with the future application to test spectral data.

3. The method of claim 2 further comprising obtaining test spectral data for a test sample with the operational condition, relating the idealized function, the standard function, the standard spectral data and the operational spectral data with a transformation function, and computing standardized spectral information for the test sample corrected for the intrinsic distortion by application of the transformation function to the test spectral data.

4. The method of claim 3 wherein the idealized function $J_I$, the standard function $J_1$, the standard spectral data $S_1^C$ and the operational spectral data $S_2^C$ are related with the transformation function F by a first relationship $F = (J_I/J_1)*(S_1^C/S_2^C)$, and the transformation function is applied to the test spectral data $S_2^T$ to compute the standardized spectral information $S_I^T$ by a second relationship $S_I^T = S_2^T * F$.

5. The method of claim 4 wherein the sample set includes a basic sample having predetermined fundamental spectral data $S_0^B$, and the step of establishing comprises obtaining basic spectral data $S_1^B$ for the basic sample with the standardizing condition, and determining the standard function $J_1$ by a further relationship $J_1 = S_1^B/S_0^B$.

6. The method of claim 5 wherein the step of obtaining basic spectral data comprises obtaining initial spectral data for the basic sample with the standardizing condition, determining a baseline from the initial spectral data and the fundamental spectral data, and computing the basic spectral data from the baseline and the initial spectral data.

7. The method of claim 6 wherein the baseline BL is determined from the initial spectral data $S_{2i}^B$ and the fundamental spectral data $S_0^B$ by a function $BL = [(S_{2i}^B/S_0^B)/(1/S_0^B - 1)]_{av}$, where the subscript av designates averaging over a selected wavenumber range for the spectral data, and the basic spectral data is computed from the baseline and the initial spectral data by a formula $S_2^B = (BL - S_{2i}^B)/BL$.

8. The method of claim 1 wherein the sample set includes a basic sample having predetermined fundamental spectral data, and the step of establishing comprises obtaining basic spectral data for the basic sample with the standardizing condition, and determining the standard function by a relationship with the basic spectral data and the fundamental spectral data.

9. The method of claim 1 wherein:

the sample set includes a basic sample having predetermined fundamental spectral data $S_0^B$, and the step of establishing comprises obtaining basic spectral data $S_1^B$ for the basic sample with the standardizing condition, and determining the standard function $J_1$ from a further relationship $J_1 = S_1^B/S_0^B$;

the idealized function is a first idealized function $J_I$ associated with the operational condition, and the method further comprises selecting a second idealized function $J_{I1}$ of spectral line shape for a hypothetically sharp spectral line, the second idealized function being associated with the standardizing condition;

the method further comprises computing an intermediate relationship $S_{I1}^C = S_1^C * (J_{I1}/J_1)$ from the standard spectral data $S_1^C$; and the step of storing comprises storing computational components including the intermediate relationship $S_{f1}^C$, the standard function $J_1$ and the second idealized function $J_{f1}$, the second idealized function $J_{f1}$ being stored directly or in a computed form $J_{f1}/J_1$.

10. The method of claim 9 further comprising obtaining operational spectral data $S_2^C$ for a standard sample with the operational condition, computing a first relationship $F=J_f/[J_{f1}*(S_2^C/S_{f1}^C)]$ from the stored computational components, and storing the first relationship for the future application to test spectral data to effect standardized spectral data.

11. The method of claim 10 wherein the transformation function is applied to the test spectral data $S_2^T$ to compute the standardized spectral information $S_I^T$ by a second relationship $S_I^T=S_2^T*F$.

12. The method of claim 1 wherein the step of establishing comprises selecting the standard function theoretically.

13. The method of claim 1 wherein the optical component comprises an aperture stop in the optical train that introduces the intrinsic distortion relative to aperture size, the standardizing condition comprises a standardizing aperture having a first aperture size, and the operational condition comprises an operational aperture having a second aperture size.

14. The method of claim 13 wherein the optical train further includes an effective light source and a focusing means disposed to image the effective light source on the sample, the focusing means having a focal length f, the standardizing aperture having an effective diameter d, and the standard function $J_1$ being established by a further relationship $J_1=\beta^2\sigma/8$ where $\beta=\sin^{-1}(d/f)$ and $\sigma$ is wavenumber for spectral data.

15. The method of claim 1 wherein the spectral means comprises interferometer means for effecting a time-scanned interference beam passed through the sample to effect the spectral beam, and the spectral data is obtained by applying a Fourier transform computation to corresponding signal data.

16. The method of claim 15 further comprising obtaining operational spectral data for a standard sample with the operational condition, obtaining test spectral data for a test sample with the operational condition, relating the idealized function, the standard function, the standard spectral data and the operational spectral data with a transformation function, and computing standardized spectral information for the test sample corrected for the intrinsic distortion by application of the transformation function to the test spectral data, wherein:

the idealized function has a profile with a width proportional to wavenumber, the step of specifying comprises specifying the idealized function in logarithmic space independently of wavenumber, the step of establishing comprises establishing the standard function in logarithmic space independently of wavenumber, and each of the steps of obtaining spectral data further comprises applying the Fourier transform computation to corresponding signal data to effect preliminary data, and computing a logarithm of the corresponding preliminary data to effect corresponding sample data in the logarithmic space, such that the transformation filter is defined in the logarithmic space; and the step of computing standardized spectral information comprises computing a logarithmic form of the test spectral data, multiplying the logarithmic form by the transformation filter to effect a transformed form of the test spectral data, and computing an anti-logarithm of the transformed form to effect the standardized spectral information.

17. The method of claim 16 wherein the idealized function $J_I$, the standard function $J_1$, the standard spectral data $S_1^C$ and the operational spectral data $S_2^C$ are related with the transformation function F by a first relationship $F=(J_I/J_1)*(S_1^C/S_2^C)$, and the transformation function is applied to the test spectral data $S_2^T$ to compute the standardized spectral information $S_I^T$ by a second relationship $S_I^T=S_2^T*F$.

18. The method of claim 17 wherein the idealized function is specified in logarithmic space by logarithmic conversion of a nominally rectangular profile with rounded corners.

19. A method of standardizing spectral information for a sample in a spectrometric instrument that effects an intrinsic distortion into spectral data, the instrument including an optical train with spectral means for effecting a spectral beam responsively to a sample such that the spectral beam is characteristic of the sample, detector means for detecting the spectral beam to effect signal data representative thereof, computing means receptive of the signal data for computing corresponding spectral information representative of the sample, and display means for displaying the spectral information, the sample being selectable from a sample set including a test sample and a standard sample formed of a substance having fundamental spectral data with a predetermined profile; wherein the method comprises steps of specifying an idealized function for spectral line shape, and storing the idealized function and the fundamental spectral data in a selected format for future application to spectral data.

20. The method of claim 19 further comprising obtaining operational spectral data for a standard sample, and storing the operational spectral data in a further selected format for future application to test spectral data.

21. The method of claim 20 further comprising, without changing instrument conditions to change instrinsic distortion, obtaining test spectral data for a test sample, relating the idealized function, the fundamental spectral data and the standard spectral data with a transformation function, and computing standardized spectral information for the test sample corrected for the intrinsic distortion by application of the transformation function to the test spectral data.

22. The method of claim 21 wherein the idealized function $J_I$, the fundamental spectral data $S_0^C$ and the standard spectral data $S_2^C$ are related with the transformation function F by a first relationship $F=J_I*(S_0^C/S_2^C)$, and the transformation function is applied to the test spectral data $S_2^T$ to compute the standardized spectral information $S_I^T$ by a second relationship $S_I^T=S_2^T*F$.

23. The method of claim 19 wherein the spectral means comprises interferometer means for effecting a time-scanned interference beam passed through the sample to effect the spectral beam, and the spectral data is obtained by applying a Fourier transform computation to corresponding signal data.

24. The method of claim 23 further comprising, without changing instrument conditions to change instrinsic distortion, obtaining operational spectral data for a standard sample, obtaining test spectral data for a test sample, relating the idealized function, the fundamental spectral data and the operational spectral data with a transformation function, and computing standardized spectral information for the test sample corrected for the intrinsic distortion by application of the transformation function to the test spectral data, wherein:

the idealized function has a profile with a width proportional to wavenumber, the step of specifying comprises specifying the idealized function in logarithmic space independently of wavenumber, and each of the steps of obtaining spectral data further comprises applying the Fourier transform computation to corresponding signal data to effect preliminary data, and computing a logarithm of the corresponding preliminary data to effect corresponding sample data in the logarithmic space, such that the transformation filter is defined in the logarithmic space; and the step of computing standardized spectral information comprises computing a logarithmic form of the test spectral data, multiplying the logarithmic form by the transformation filter to effect a transformed form of the test spectral data, and computing an anti-logarithm of the transformed form to effect the standardized spectral information.

25. The method of claim 24 wherein the idealized function $J_I$, the fundamental spectral data $S_0^C$ and the standard spectral data $S_2^C$ are related with the transformation function F by a first relationship $F=J_I*(S_0^C/S_2^C)$, and the transformation function is applied to the test spectral data $S_2^T$ to compute the standardized spectral information $S_I^T$ by a second relationship $S_I^T=S_2^T*F$.

26. The method of claim 25 wherein the idealized function is specified in logarithmic space by logarithmic conversion of a nominally rectangular profile with rounded corners.

27. The method of claim 19 wherein the step of obtaining operational spectral data comprises obtaining initial spectral data for the standard sample, determining a baseline from the initial spectral data and the fundamental spectral data, and computing the operational spectral data from the baseline and the initial spectral data.

28. The method of claim 27 wherein the baseline BL is determined from the initial spectral data $S_{2i}^C$ and the fundamental spectral data $S_0^C$ by a function $BL=[(S_{2i}^C/S_0^C)/(1/S_0^C-1)]_{av}$, where the subscript av designates averaging over a selected wavenumber range for the spectral data, and the operational spectral data is computed from the baseline and the initial spectral data by a formula $S_2^C=(BL-S_{2i}^C)/BL$.

29. A method of standardizing spectral information for a sample in a spectrometric instrument that effects an intrinsic distortion into spectral data, the instrument including an optical train with spectral means for effecting a spectral beam responsively to a sample such that the spectral beam is characteristic of the sample, detector means for detecting the spectral beam to effect signal data representative thereof, computing means receptive of the signal data for computing corresponding spectral information representative of the sample, and display means for displaying the spectral information, the optical train including an optical component selectively having a calibration condition or an operational condition, such condition effecting the intrinsic distortion, wherein the method comprises steps of:

(a) determining a spectrum associated with the calibration condition;

(b) measuring a spectrum with the optical component in the operating condition, the operating condition being selected so as to introduce into said spectrum a change associated with the operational condition;

(c) generating a mathematical function that transforms the spectrum of step (a) into the spectrum of step (b);

(d) determining for the instrument a standard function characteristic of the calibration condition;

(e) using the mathematical function to transform the standard function of the calibration condition to a corresponding standard function of the operational condition;

(f) determining a theoretical idealized function for the operational condition for the instrument;

(g) creating a transformation function which transforms the standard function of the operational condition to the theoretical idealized function; and (h) using the transformation function to transform a spectrum of a sample measured in the operational condition to a standardized spectrum for the sample.

30. The method of claim 29 wherein the calibration condition is a standardizing condition, and step (a) comprises measuring the spectrum with the optical component in a standardizing condition.

31. The method of claim 30 further comprising measuring a spectrum of a basic sample with the optical component in the standardizing condition, the basic sample having predetermined fundamental spectral data, and determining the characterizing function from a relationship with the fundamental spectral data and the spectrum of the basic sample.

32. The method of claim 31 wherein the standard function of step (d) is determined theoretically.

33. The method of claim 31 wherein the calibration condition is a hypothetical basic condition, and step (a) comprises selecting a fundamental spectrum associated with the hypothetical basic condition.

34. A spectrometric instrument with standardizing of spectral information for a sample, wherein the instrument effects an intrinsic distortion into spectral data, the instrument comprising:

an optical train with spectral means for effecting a spectral beam responsively to a sample such that the spectral beam is characteristic of the sample, detector means for detecting the spectral beam to effect signal data representative thereof, computing means receptive of the signal data for computing corresponding spectral information representative of the sample, and display means for displaying the spectral information, the optical train including an optical component selectively having a standardizing condition or an operational condition, such condition having the intrinsic distortion associated therewith, and the sample being selectable from a sample set including a test sample and one or more standard samples formed of a substance having true spectral data;

means for storing an idealized function for spectral line shape, standard spectral data for a standard sample predetermined by operation of the instrument with the standardizing condition, and a standard function that relates the standard spectral data to the true spectral data; and means for applying the idealized function, the standard spectral data and the standard function to future test spectral data to effect standardized spectral data.

35. The instrument of claim 34 further comprising means for obtaining operational spectral data for a standard sample with the operational condition, and means for storing the operational spectral data for inclusion with the means for applying for future application to test spectral data.

36. The instrument of claim 35 further comprising means for obtaining test spectral data for a test sample with the operational condition, means for relating the idealized function, the standard function, the standard spectral data and the operational spectral data with a transformation function, and means for computing standardized spectral information for the test sample corrected for the intrinsic distortion by application of the transformation function to the test spectral data.

37. The instrument of claim 36 wherein the idealized function $J_I$, the standard function $J_1$, the standard spectral data $S_1^C$ and the operational spectral data $S_2^C$ are related with the transformation function F by a first relationship $F=(J_I/J_1)*(S_{1C}/S_2^C)$, and the transformation function is applied to the test spectral data $S_2^T$ to compute the standardized spectral information $S_I^T$ by a second relationship $S_I^T=S_2^T*F$.

38. The instrument of claim 37 wherein the sample set includes a basic sample having predetermined fundamental spectral data $S_0^B$, and the instrument further comprises means for obtaining basic spectral data $S_1^B$ for the basic sample with the standardizing condition, and means for determining the standard function $J_1$ by a further relationship $J_1=S_1^B/S_0^B$.

39. The instrument of claim 34 wherein the sample set includes a basic sample having predetermined fundamental spectral data, and the instrument further comprises means for obtaining basic spectral data for the basic sample with the standardizing condition, and means for determining the standard function by a relationship with the basic spectral data and the fundamental spectral data.

40. The instrument of claim 34 wherein:
the sample set includes a basic sample having predetermined fundamental spectral data $S_0^B$, and the means for establishing comprises means for obtaining basic spectral data $S_1^B$ for the basic sample with the standardizing condition, and means for computing the standard function $J_1$ from a further relationship $J_1=S_1^B/S_0^B$; and
the idealized function is a first idealized function $J_I$ associated with the operational condition, the instrument further comprises means for computing an intermediate relationship $S_{I1}^C=S_1^C*(J_{I1}/J_1)$ from the standard spectral data $S_1^C$, the means for storing stores computational components including the intermediate relationship $S_{I1}^C$, the standard function $J_1$ and a second idealized function $J_{I1}$ of spectral line shape for a hypothetically sharp spectral line, the second idealized function $J_{I1}$ being associated with the standardizing condition and stored directly or in a computed form $J_{I1}/J_1$.

41. The instrument of claim 40 further comprising means for obtaining operational spectral data $S_2^C$ for a standard sample with the operational condition, means for computing a first relationship $F=J_I/[J_{I1}*(S_2^C/S_{I1}^C)]$ from the stored computational components, and means for storing the first relationship for the future application to test spectral data to effect standardized spectral data.

42. The instrument of claim 41 wherein the transformation function is applied to the test spectral data $S_2^T$ to compute the standardized spectral information $S_I^T$ by a second relationship $S_I^T=S_2^T*F$.

43. The instrument of claim 34 wherein the standard function is a theoretical function.

44. The instrument of claim 34 wherein the optical component comprises an aperture stop in the optical train that introduces the intrinsic distortion relative to aperture size, the standardizing condition comprises a standardizing aperture having a first aperture size, and the operational condition comprises an operational aperture having a second aperture size.

45. The instrument of claim 44 wherein the optical train further includes an effective light source and a focusing means disposed to image the effective light source on the sample, the focusing means having a focal length f, the standardizing aperture having an effective diameter d, and the standard function $J_1$ being established by a further relationship $J_1=\beta^2\sigma/8$ where $\beta=\sin^{-1}(d/f)$ and $\sigma$ is wavenumber for spectral data.

46. The instrument of claim 34 wherein the spectral means comprises interferometer means for effecting a time-scanned interference beam passed through the sample to effect the spectral beam, and the instrument further comprises means for obtaining spectral data by application of a Fourier transform computation to corresponding signal data.

47. The instrument of claim 46 further comprising means for obtaining operational spectral data for a standard sample with the operational condition, means for obtaining test spectral data for a test sample with the operational condition, means for relating the idealized function, the standard function, the standard spectral data and the operational spectral data with a transformation function, and means for computing standardized spectral information for the test sample corrected for the intrinsic distortion by application of the transformation function to the test spectral data, wherein:
the idealized function has a profile with a width proportional to wavenumber, the idealized function is specified in logarithmic space independently of wavenumber, the standard function is established in logarithmic space independently of wavenumber, and each means for obtaining spectral data further comprises means for applying the Fourier transform computation to corresponding signal data to effect preliminary data, and means for computing a logarithm of the corresponding preliminary data to effect corresponding sample data in the logarithmic space, such that the transformation filter is defined in the logarithmic space; and
the means for computing standardized spectral information comprises means for computing a logarithmic form of the test spectral data, means for multiplying the logarithmic form by the transformation filter to effect a transformed form of the test spectral data, and means for computing an anti-logarithm of the transformed form to effect the standardized spectral information.

48. The instrument of claim 47 wherein the idealized function $J_I$, the standard function $J_1$, the standard spectral data $S_1^C$ and the operational spectral data $S_2^C$ are related with the transformation function F by a first relationship $F=(J_I/J_1)*(S_1^C/S_2^C)$, and the transformation function is applied to the test spectral data $S_2^T$ to compute the standardized spectral information $S_I^T$ by a second relationship $S_I^T=S_2^T*F$.

49. The instrument of claim 48 wherein the idealized function is specified in logarithmic space by logarithmic conversion of a nominally rectangular profile with rounded corners.

50. A spectrometric instrument with standardizing of spectral information for a sample, wherein the instrument effects an intrinsic distortion into spectral data, the instrument comprising:
an optical train with spectral means for effecting a spectral beam responsively to a sample such that the spectral beam is characteristic of the sample, detector means for detecting the spectral beam to effect signal data representative thereof, computing means receptive of the signal data for computing corresponding spectral information representative of the sample, and display means for displaying the spectral information, the sample being selectable from a sample set including a test sample and a standard sample formed of a substance having fundamental spectral data with a predetermined profile;
means for storing the fundamental spectral data and a preselected idealized function for spectral line shape;

and means for applying the fundamental spectral data and the idealized function to future test spectral data to effect standardized spectral data.

51. The instrument of claim 50 further comprising means for obtaining operational spectral data for a standard sample, and means for storing the operational spectral data for inclusion with the means for applying for future application to test spectral data.

52. The instrument of claim 51 further comprising, without changing instrument conditions to change instrinsic distortion, means for operating the instrument to obtain test spectral data for a test sample, means for relating the idealized function, the fundamental spectral data and the standard spectral data with a transformation function, and means for computing standardized spectral information for the test sample corrected for the intrinsic distortion by application of the transformation function to the test spectral data.

53. The instrument of claim 52 wherein the idealized function $J_I$, the fundamental spectral data $S_0^C$ and the standard spectral data $S_2^C$ are related with the transformation function F by a first relationship $F=J_I*(S_0^C/S_2^C)$, and the transformation function is applied to the test spectral data $S_2^T$ to compute the standardized spectral information $S_I^T$ by a second relationship $S_I^T=S_2^T*F$.

54. The instrument of claim 50 wherein the spectral means comprises interferometer means for effecting a time-scanned interference beam passed through the sample to effect the spectral beam, and the instrument further comprises means for obtaining spectral data by application of a Fourier transform computation to corresponding signal data.

55. The instrument of claim 54 further comprising, without changing instrument conditions to change instrisic distortion, means for obtaining operational spectral data for a standard sample, means for obtaining test spectral data for a test sample, means for relating the idealized function, the fundamental spectral data and the operational spectral data with a transformation function, and means for computing standardized spectral information for the test sample corrected for the intrinsic distortion by application of the transformation function to the test spectral data, wherein:

the idealized function has a profile with a width proportional to wavenumber, the idealized function is specified in logarithmic space independently of wavenumber, and each means for obtaining spectral data further comprises means for applying the Fourier transform computation to corresponding signal data to effect preliminary data, and means for computing a logarithm of the corresponding preliminary data to effect corresponding sample data in the logarithmic space, such that the transformation filter is defined in the logarithmic space; and the means for computing standardized spectral information comprises means for computing a logarithmic form of the test spectral data, means for multiplying the logarithmic form by the transformation filter to effect a transformed form of the test spectral data, and means for computing an anti-logarithm of the transformed form to effect the standardized spectral information.

56. The instrument of claim 55 wherein the idealized function $J_I$, the fundamental spectral data $S_0^C$ and the standard spectral data $S_2^C$ are related with the transformation function F by a first relationship $F=J_I*(S_0^C/S_2^C)$, and the transformation function is applied to the test spectral data $S_2^T$ to compute the standardized spectral information $S_I^T$ by a second relationship $S_I^T=S_2^T*F$.

57. The instrument of claim 56 wherein the idealized function is specified in logarithmic space by logarithmic conversion of a nominally rectangular profile with rounded corners.

58. A computer readable storage medium for utilization to standardize spectral information for a sample in a spectrometric instrument that effects an intrinsic distortion into spectral data, the instrument including an optical train with spectral means for effecting a spectral beam responsively to a sample such that the spectral beam is characteristic of the sample, detector means for detecting the spectral beam to effect signal data representative thereof, and computing means receptive of the signal data for computing corresponding spectral information representative of the sample, the optical train including an optical component selectively having a standardizing condition or an operational condition, such condition having the intrinsic distortion associated therewith, the sample being selectable from a sample set including a test sample and one or more standard samples formed of a substance having true spectral data, operational spectral data being obtainable for a standard sample with the operational condition, test spectral data being obtainable for the test sample with the operational condition, and the storage medium having data code and program code embodied therein so as to be readable by the computing means; wherein:

the data code comprises an idealized function for spectral line shape, and standard spectral data obtained for a standard sample with the standardizing condition, or a multiplication product of the idealized function and the standard spectral data; and the program code comprises means for establishing a standard function that relates the standard spectral data to the true spectral data, means for relating the idealized function, the standard function, the standard spectral data and the operational spectral data with a transformation function, and means for computing standardized spectral information for the test sample corrected for the intrinsic distortion by application of the transformation function to the test spectral data.

59. The storage medium of claim 58 wherein the idealized function $J_I$, the standard function $J_1$, the standard spectral data $S_1^C$ and the operational spectral data $S_2^C$ are related with the transformation function F by a first relationship $F=(J_I/J_1)*(S_1^C/S_2^C)$, and the means for computing applies the transformation function to the test spectral data $S_2^T$ to compute the standardized spectral information $S_I^T$ by a second relationship $S_I^T=S_2^T*F$.

60. The storage medium of claim 59 wherein the data code further comprises fundamental spectral data $S_0^B$ for a basic sample, and basic spectral data $S_1^B$ obtained for the basic sample with the standardizing condition, and the means for establishing the standard function $J_1$ comprises relating the basic spectral data to the fundamental spectral data by a further relationship $J_1=S_1^B/S_0^B$.

61. The storage medium of claim 58 wherein the data code further comprises fundamental spectral data for a basic sample, and basic spectral data obtained for the basic sample with the standardizing condition, and the means for establishing the standard function comprises relating the basic spectral data to the fundamental spectral data.

62. The storage medium of claim 58 wherein:

the data code further comprises fundamental spectral data $S_0^B$ for a basic sample, and basic spectral data $S_1^B$ obtained for the basic sample with the standardizing condition, and the means for establishing the standard function $J_1$ comprises relating the basic spectral data to the fundamental spectral data by a further relationship $J_1=S_1^B/S_0^B$; and the idealized function is a first idealized function $J_I$ associated with the operational condition, the program code further comprises means for computing an intermediate relationship $S_{f1}{}^C = S_1{}^C * (J_{f1}/J_1)$ from the standard spectral data $S_1{}^C$, and means for storing computational components including the intermediate relationship $S_{f1}{}^C$, the standard function $J_1$ and a second idealized function $J_{f1}$ of spectral line shape for a hypothetically sharp spectral line, the second idealized function $J_{f1}$ being associated with the standardizing condition and stored directly or in a computed form $J_{f1}/J_1$.

63. The storage medium of claim 62 wherein the program code further comprises means for storing operational spectral data $S_2{}^C$ for a standard sample with the operational condition, means for computing a first relationship $F = J_f / [J_{f1} * (S_2{}^C/S_{f1}{}^C)]$ from the stored computational components, and means for storing the first relationship for the future application to test spectral data to effect standardized spectral data.

64. The storage medium of claim 63 wherein the means for computing applies the transformation function to the test spectral data $S_2{}^T$ to compute the standardized spectral information $S_I{}^T$ by a second relationship $S_I{}^T = S_2{}^T * F$.

65. The storage medium of claim 58 wherein the standard function is a theoretical function.

66. The storage medium of claim 58 wherein:
the spectral means comprises interferometer means for effecting a time-scanned interference beam passed through the sample to effect the spectral beam, the instrument further comprises means for obtaining spectral data by application of a Fourier transform computation to corresponding signal data, the idealized function has a profile with a width proportional to wavenumber, the idealized function is specified in logarithmic space independently of wavenumber, the standard function is established in logarithmic space independently of wavenumber, and each means for obtaining spectral data further comprises means for applying the Fourier transform computation to corresponding signal data to effect preliminary data;

the program code further comprises means for computing a logarithm of the corresponding preliminary data to effect corresponding sample data in the logarithmic space, such that the transformation filter is defined in the logarithmic space; and the means for computing standardized spectral information comprises means for computing a logarithmic form of the test spectral data, means for multiplying the logarithmic form by the transformation filter to effect a transformed form of the test spectral data, and means for computing an anti-logarithm of the transformed form to effect the standardized spectral information.

67. The storage medium of claim 66 wherein the idealized function $J_f$, the standard function $J_1$, the standard spectral data $s_1{}^C$ and the operational spectral data $S_2{}^C$ are related with the transformation function F by a first relationship $F = (J_f J_1) * ((S_1{}^C/S_2{}^C))$, and the transformation function is applied to the test spectral data $S_2{}^T$ to compute the standardized spectral information $S_I{}^T$ by a second relationship $S_I{}^T = S_2{}^T * F$.

68. The storage medium of claim 67 wherein the data code further comprises fundamental spectral data $S_0{}^B$ for a basic sample, and basic spectral data $S_1{}^B$ obtained for the basic sample with the standardizing condition, and the means for establishing the standard function $J_1$ comprises relating the basic spectral data to the fundamental spectral data by a further relationship $J_1 = S_1{}^B/S_0{}^B$.

69. The storage medium of claim 68 wherein the transformation function includes an apodization, the spectral means comprises interferometer means for effecting a time-scanned interference beam passed through the sample to effect the spectral beam, the instrument further comprises means for obtaining spectral data by application of a Fourier transform computation to corresponding signal data, the idealized function has a profile with a width proportional to wavenumber, the idealized function is specified in logarithmic space independently of wavenumber, the standard function is established in logarithmic space independently of wavenumber, and each means for obtaining spectral data further comprises means for applying the Fourier transform computation to corresponding signal data to effect preliminary data;

the program code further comprises means for computing a logarithm of the corresponding preliminary data to effect corresponding sample data in the logarithmic space, such that the transformation filter is defined in the logarithmic space;

the means for computing standardized spectral information comprises means for computing a logarithmic form of the test spectral data, means for multiplying the logarithmic form by the transformation filter to effect a transformed form of the test spectral data, and means for computing an anti-logarithm of the transformed form to effect the standardized spectral information;

and the fundamental spectral data is in a form that is apodized, interpolated, logarithm applied and axis shifted.

70. A computer readable storage medium for utilization to standardize spectral information for a sample in a spectrometric instrument that effects an intrinsic distortion into spectral data, the instrument including an optical train with spectral means for effecting a spectral beam responsively to a sample such that the spectral beam is characteristic of the sample, detector means for detecting the spectral beam to effect signal data representative thereof, and computing means receptive of the signal data for computing corresponding spectral information representative of the sample, the sample being selectable from a sample set including a test sample and a standard sample formed of a substance having fundamental spectral data with a predetermined profile, operational spectral data being obtainable for a standard sample with the instrument, test spectral data being obtainable for the test sample with the instrument, and the storage medium having data code and program code embodied therein so as to be readable by the computing means; wherein:

the data code comprises an idealized function for spectral line shape, and fundamental spectral data for a standard sample, or a multiplication product of the idealized function and the fundamental spectral data; and the program code comprises means for relating the idealized function, the standard spectral data and the operational spectral data with a transformation function, and means for computing standardized spectral information for the test sample corrected for the intrinsic distortion by application of the transformation function to the test spectral data.

71. The storage medium of claim 70 wherein the idealized function $J_f$, the fundamental spectral data $S_0{}^C$ and the standard spectral data $S_2{}^C$ are related with the transformation function F by a first relationship $F = J_f * (S_0{}^C/S_2{}^C)$, and the transformation function is applied to the test spectral data $S_2{}^T$ to compute the standardized spectral information $S_I{}^T$ by a second relationship $S_I{}^T = S_2{}^T * F$.

72. The storage medium of claim 70 wherein:
the spectral means comprises interferometer means for effecting a time-scanned interference beam passed through the sample to effect the spectral beam, the instrument further comprises means for obtaining spectral data by application of a Fourier transform computation to corresponding signal data, the idealized function has a profile with a width proportional to wavenumber, the idealized function is specified in logarithmic space independently of wavenumber, the standard function is established in logarithmic space independently of wavenumber, and each means for obtaining spectral data further comprises means for applying the Fourier transform computation to corresponding signal data to effect preliminary data;

the program code further comprises means for computing a logarithm of the corresponding preliminary data to effect corresponding sample data in the logarithmic space, such that the transformation filter is defined in the logarithmic space; and and the means for computing standardized spectral information comprises means for computing a logarithmic form of the test spectral data, means for multiplying the logarithmic form by the transformation filter to effect a transformed form of the test spectral data, and means for computing an anti-logarithm of the transformed form to effect the standardized spectral information.

73. The storage medium of claim 72 wherein the idealized function $J_I$, the fundamental spectral data $S_0^C$ and the standard spectral data $S_2^C$ are related with the transformation function F by a first relationship $F=J_I*(S_0^C/S_2^C)$, and the transformation function is applied to the test spectral data $S_2^T$ to compute the standardized spectral information $S_I^T$ by a second relationship $S_I^T=S_2^T*F$.

74. A computer readable storage medium for utilization to standardize spectral information for a sample in a spectrometric instrument that effects an intrinsic distortion into spectral data, the instrument including an optical train with spectral means for effecting a spectral beam responsively to a sample such that the spectral beam is characteristic of the sample, detector means for detecting the spectral beam to effect signal data representative thereof, and computing means receptive of the signal data for computing corresponding spectral information representative of the sample, the optical train including an optical component selectively having a standardizing condition or an operational condition, such condition having the intrinsic distortion associated therewith, the sample being selectable from a sample set including a test sample and one or more standard samples, operational spectral data being obtainable for a standard sample with the operational condition, test spectral data being obtainable for the test sample with the operational condition, and the storage medium having data code embodied therein so as to be readable by the computing means; wherein:
the data code comprises an idealized function for spectral line shape associated with the standardizing condition, and standard spectral data obtained for a standard sample with the standardizing condition, the idealized function and the standard spectral data having a cooperative relationship for application to the test spectral data.

75. The storage medium of claim 74 wherein the idealized function is a second idealized function $J_{I1}$ for spectral line shape associated with the standardizing condition, the computing means has potentially stored therein a first idealized function $J_I$ for spectral line shape associated with the operational condition, and the second idealized function and the test spectral data $S_1^C$ have the cooperative relationship $S_{I1}^C=S_1^C*(J_{I1}/J_1)$.

76. A computer readable storage medium for utilization in standardizing spectral information for a sample in a spectrometric instrument that effects an intrinsic distortion into spectral data, the instrument including computing means receptive of the signal data for computing corresponding spectral information representative of the sample, and the sample being selectable from a sample set including a test sample and a basic sample, wherein the storage medium has data code embodied therein so as to be readable by the computing means, and the data code comprises fundamental spectral data for the basic sample, the fundamental spectral data being in a form that is apodized, interpolated, logarithm applied and axis shifted.

77. A method of standardizing spectral information for a sample in a spectrometric instrument that effects an intrinsic distortion into spectral data, the instrument including an optical train with interferometer means for effecting a time-scanned interference beam characteristic of the sample, detector means for detecting the interference beam to effect either a total of energy data or signal data representative of the sample, computing means receptive of the signal data for computing corresponding spectral information representative of the sample by applying a Fourier transform computation to corresponding signal data, and display means for displaying the spectral information, the optical train including an aperture stop that introduces the intrinsic distortion relative to aperture size, the aperture stop being variable in size, and the intrinsic distortion being represented by a characterizing function, wherein the method comprises steps of:

specifying an idealized function for spectral line shape, with the idealized function and the characterizing function being related by a transformation function;

operating the instrument with a series of aperture sizes to effect corresponding energy data, computing a size derivative of the energy data with respect to aperture size, and converting the derivative to a wavenumber derivative of the energy data with respect to a function of spectral wavenumber such that the wavenumber derivative is the characterizing function; and obtaining spectral data for a sample, and computing standardized spectral information for the sample corrected for the intrinsic distortion by application of the transformation function to the test spectral data.

78. The method of claim 77 wherein:
the idealized function has a profile with a width proportional to wavenumber, the idealized function is specified in logarithmic space independently of wavenumber, the square of the aperture radius is representative of aperture size, the size derivative is with respect to said square, and the function of the spectral wavenumber is a logarithm of the wavenumber;

the step of obtaining spectral data comprises applying the Fourier transform computation to corresponding signal data to effect preliminary data, and computing a logarithm of the corresponding preliminary data to effect corresponding sample data in the logarithmic space, such that the transformation filter is defined in the logarithmic space; and the step of computing standardized spectral information comprises computing a logarithmic form of the test spectral data, multiplying the logarithmic form by the transformation filter to effect a transformed form of the test spectral data, and computing an anti-logarithm of the transformed form to effect the standardized spectral information.

79. A spectrometric instrument with standardizing of spectral information for a sample, wherein the instrument effects an intrinsic distortion into spectral data, the instrument comprising:

an optical train with interferometer means for effecting a time-scanned interference beam characteristic of the sample, detector means for detecting the interference beam to effect either a total of energy data or signal data representative of the sample, computing means receptive of the signal data for computing corresponding spectral information representative of the sample by applying a Fourier transform computation to corresponding signal data, and display means for displaying the spectral information, the optical train including an aperture stop that introduces the intrinsic distortion relative to aperture size, the aperture stop being variable in size, and the intrinsic distortion being represented by a characterizing function;

means for storing an idealized function for spectral line shape, and a transformation function relating the idealized function and a characterizing function;

means for operating the instrument with a series of aperture sizes to effect corresponding energy data, means for computing a size derivative of the energy data with respect to aperture size, and means for converting the derivative to a wavenumber derivative of the energy data with respect to a function of spectral wavenumber such that the wavenumber derivative is the characterizing function; and means for obtaining spectral data for a sample, and means for computing standardized spectral information for the sample corrected for the intrinsic distortion by application of the transformation function to the test spectral data.

80. The instrument of claim 79 wherein:

the idealized function has a profile with a width proportional to wavenumber, the idealized function is specified in logarithmic space independently of wavenumber, the square of the aperture radius is representative of aperture size, the size derivative is with respect to said square, and the function of the spectral wavenumber is a logarithm of the wavenumber; and the means for obtaining spectral data comprises means for applying the Fourier transform computation to corresponding signal data to effect preliminary data, and means for computing a logarithm of the corresponding preliminary data to effect corresponding sample data in the logarithmic space, such that the transformation filter is defined in the logarithmic space; and the means for computing standardized spectral information comprises means for computing a logarithmic form of the test spectral data, means for multiplying the logarithmic form by the transformation filter to effect a transformed form of the test spectral data, and means for computing an anti-logarithm of the transformed form to effect the standardized spectral information.

* * * * *